United States Patent
Yoon et al.

(10) Patent No.: US 11,395,344 B2
(45) Date of Patent: Jul. 19, 2022

(54) METHOD FOR TRANSMITTING AND RECEIVING RANDOM ACCESS CHANNEL AND UPLINK CHANNEL IN NON-LICENSED BAND AND APPARATUS THEREFOR

(71) Applicant: LG ELECTRONICS INC., Seoul (KR)

(72) Inventors: Sukhyon Yoon, Seoul (KR); Seonwook Kim, Seoul (KR); Changhwan Park, Seoul (KR); Hanjun Park, Seoul (KR); Joonkui Ahn, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 16/964,578

(22) PCT Filed: Jan. 23, 2019

(86) PCT No.: PCT/KR2019/000948
§ 371 (c)(1),
(2) Date: Jul. 23, 2020

(87) PCT Pub. No.: WO2019/147010
PCT Pub. Date: Aug. 1, 2019

(65) Prior Publication Data
US 2020/0383147 A1 Dec. 3, 2020

Related U.S. Application Data

(60) Provisional application No. 62/621,476, filed on Jan. 24, 2018.

(30) Foreign Application Priority Data

Sep. 20, 2018 (KR) .................. 10-2018-0112897

(51) Int. Cl.
*H04W 74/08* (2009.01)
*H04L 27/26* (2006.01)
*H04W 16/14* (2009.01)

(52) U.S. Cl.
CPC ..... *H04W 74/0833* (2013.01); *H04L 27/2605* (2013.01); *H04W 16/14* (2013.01); *H04W 74/0808* (2013.01)

(58) Field of Classification Search
None
See application file for complete search history.

(56) References Cited

U.S. PATENT DOCUMENTS

2015/0057011 A1* 2/2015 Di Girolamo .... H04W 72/0446
455/454
2016/0249384 A1* 8/2016 Di Girolamo ........ H04W 16/14
(Continued)

FOREIGN PATENT DOCUMENTS

| KR | 20170093071 | 8/2017 |
|---|---|---|
| WO | 2016167623 | 10/2016 |
| WO | 2017052193 | 3/2017 |

OTHER PUBLICATIONS

PCT International Application No. PCT/KR2019/000948, Written Opinion of the International Searching Authority dated May 1, 2019, 16 pages.

(Continued)

*Primary Examiner* — Ayaz R Sheikh
*Assistant Examiner* — Faiyazkhan Ghafoerkhan
(74) *Attorney, Agent, or Firm* — Lee Hong Degerman Kang Waimey

(57) ABSTRACT

Disclosed is a method for transmitting an uplink signal by a terminal in a non-licensed band. In particular, the method comprises: performing a clear channel assessment (CCA) on the non-licensed band; and transmitting the uplink signal on a specific slot on the basis of the result of performing the (Continued)

CCA, wherein when the specific slot is a random access channel (RACH) slot, the uplink signal is transmitted on the basis of a default timing advanced (TA) value for RACH signal transmission.

10 Claims, 28 Drawing Sheets

(56) References Cited

U.S. PATENT DOCUMENTS

| | | | |
|---|---|---|---|
| 2019/0246428 A1* | 8/2019 | Yoon | H04W 56/004 |
| 2020/0305094 A1* | 9/2020 | Ouchi | H04W 72/14 |
| 2021/0029737 A1* | 1/2021 | Pan | H04W 74/0833 |

OTHER PUBLICATIONS

ASUSTeK, "LBT Considering Beamforming in Unlicensed Spectrum," 3GPP TSG-RAN WG1 #90bis, R1-1717899, Oct. 2017, 3 pages.
NEC, "Discussion on LBT of NR unlicensed band," 3GPP TSG-RAN WG1 #91, R1-1720578, Dec. 2017, 5 pages.

* cited by examiner

FIG. 1
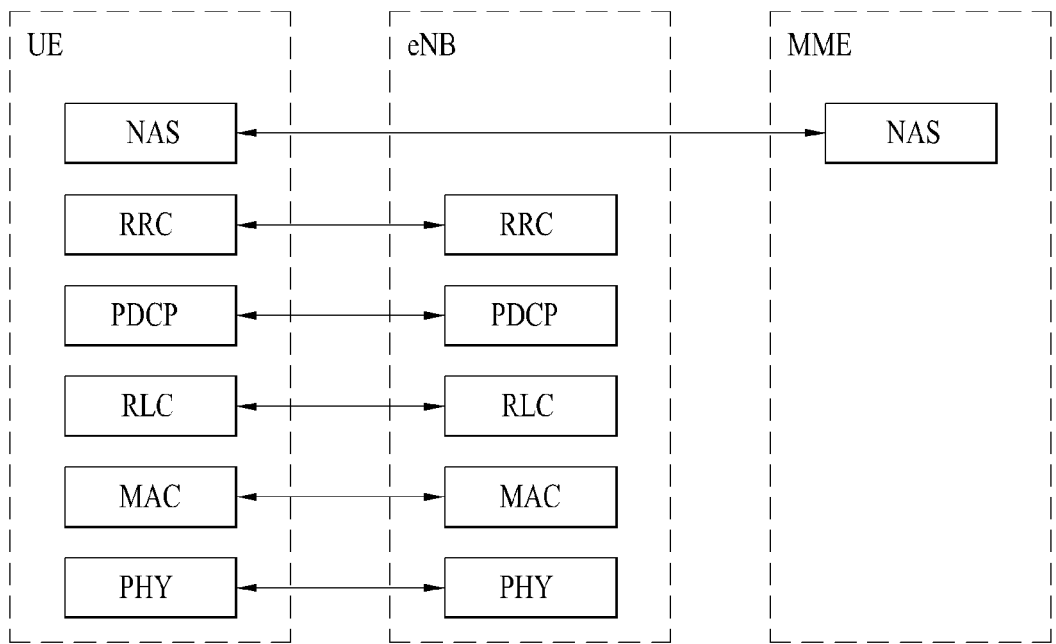
(A) CONTROL-PLANE PROTOCOL STACK
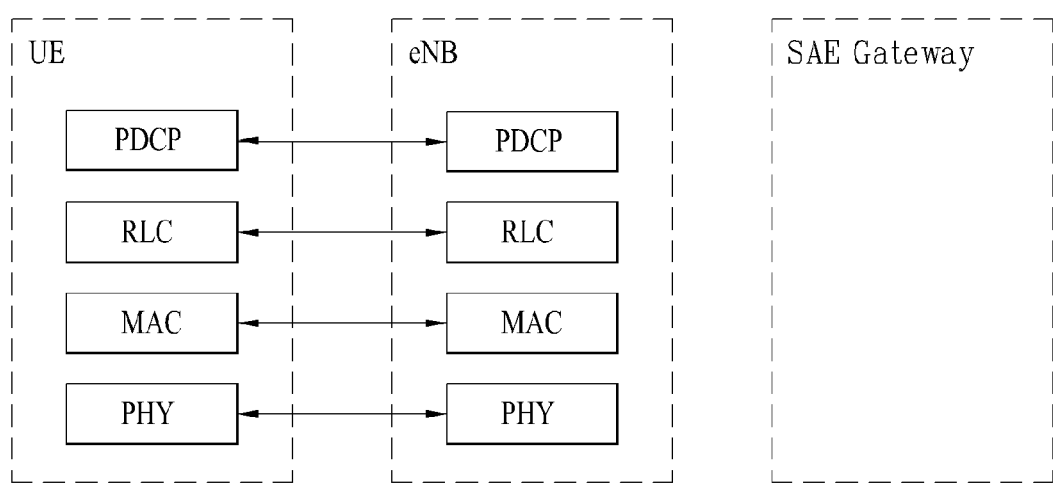
(B) USER-PLANE PROTOCOL STACK FIG. 5
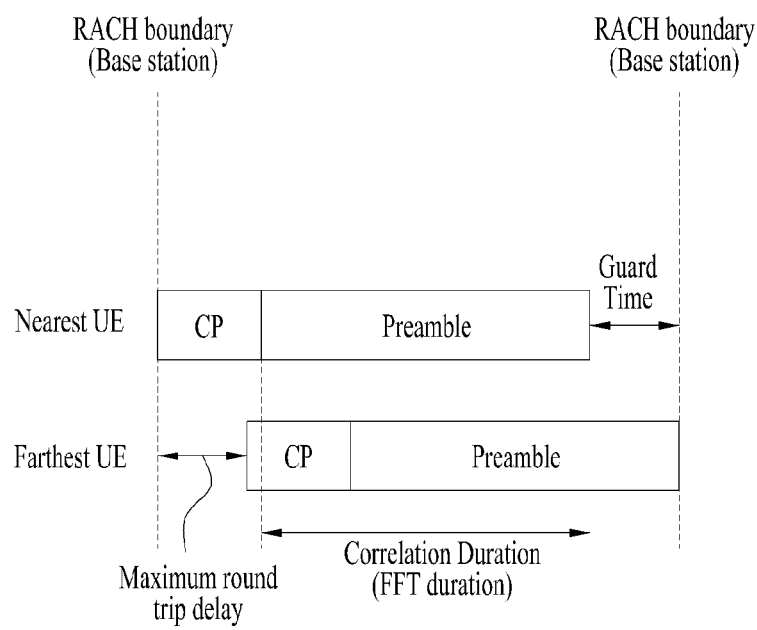
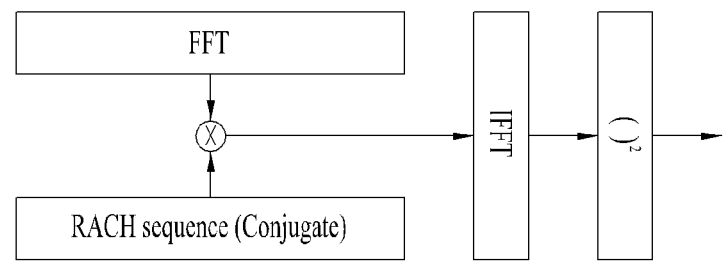

FIG. 14
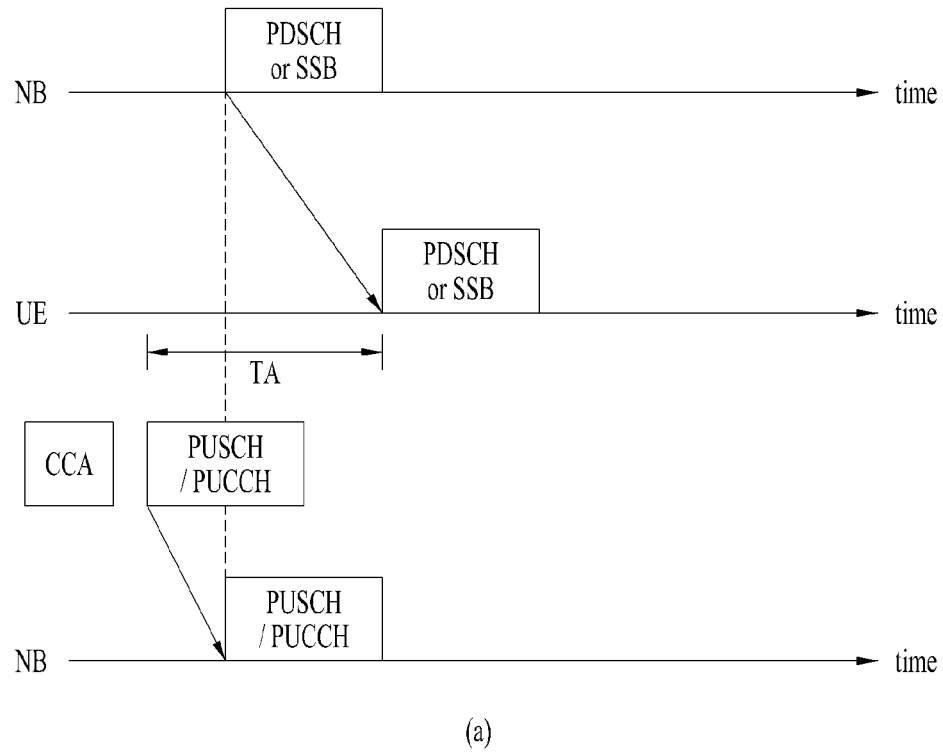
(a)
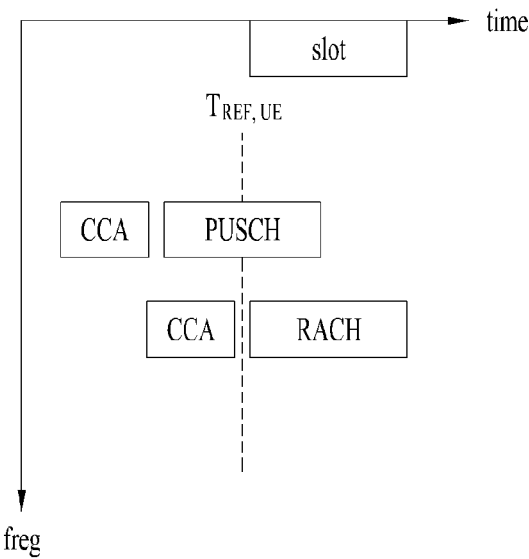
(b)

FIG. 24
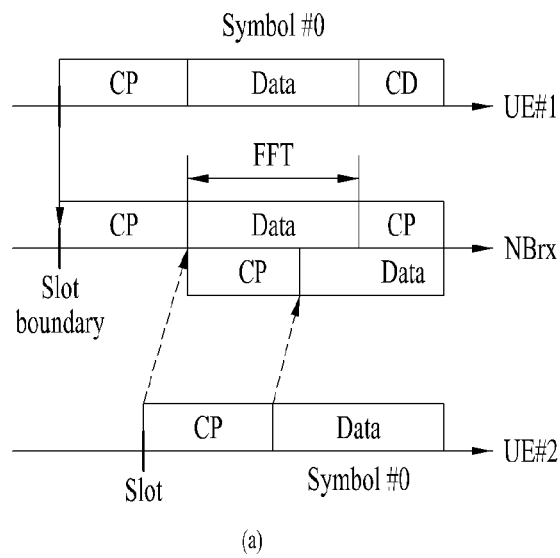
(a)
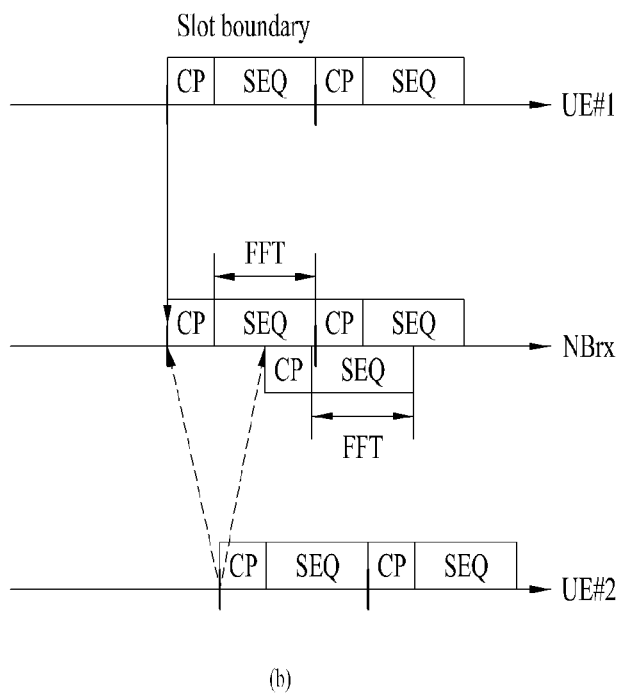
(b)

FIG. 25
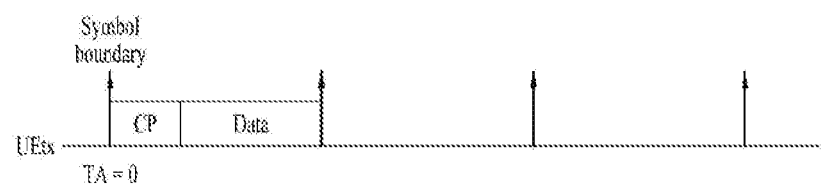
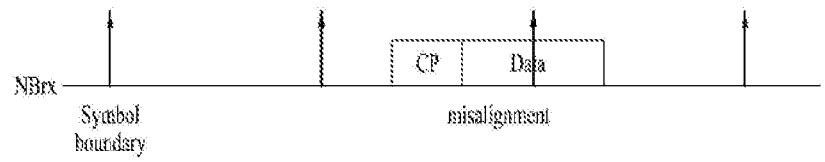
(a)
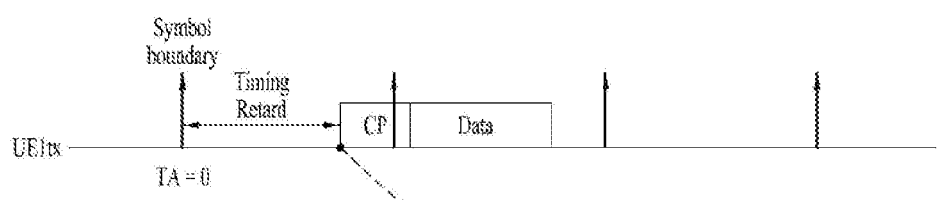
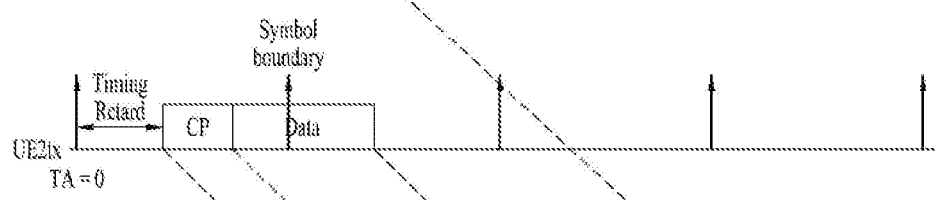
(b)

FIG. 26
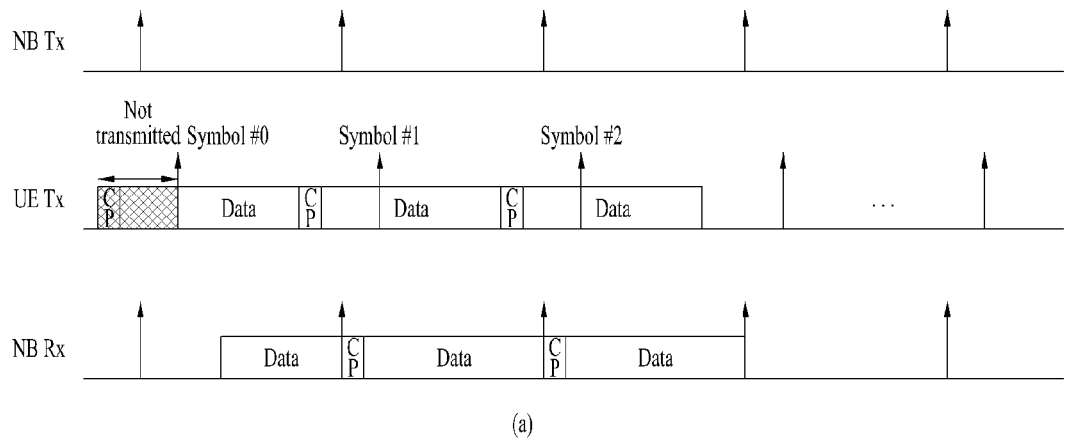
(a)
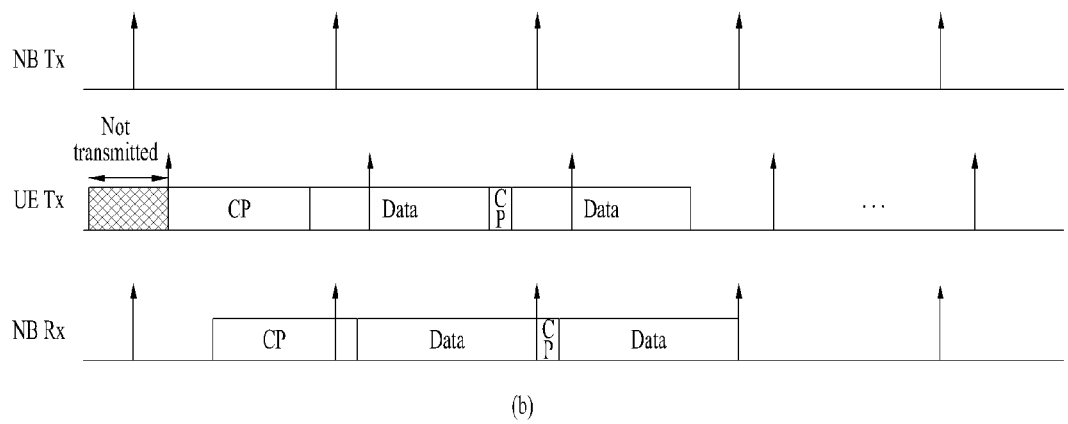
(b)
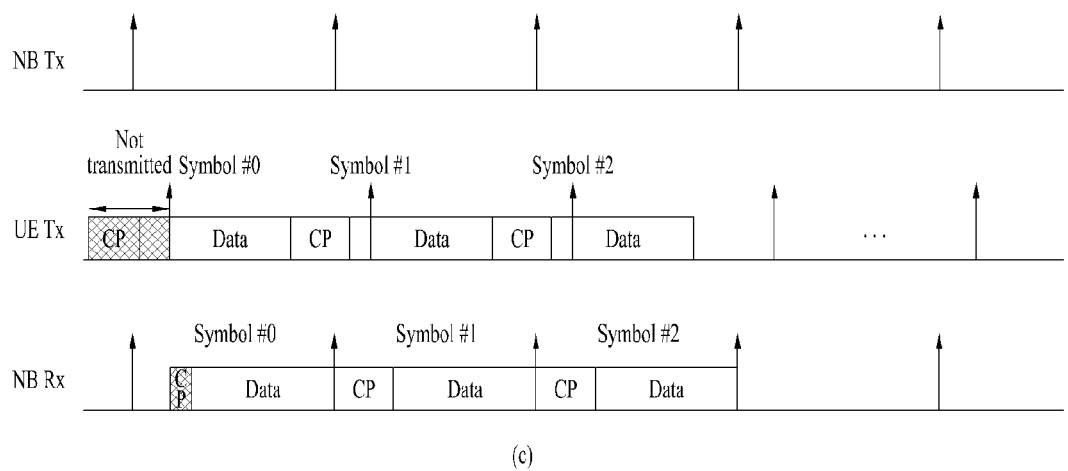
(c)

METHOD FOR TRANSMITTING AND RECEIVING RANDOM ACCESS CHANNEL AND UPLINK CHANNEL IN NON-LICENSED BAND AND APPARATUS THEREFOR

CROSS-REFERENCE TO RELATED APPLICATIONS

This application is the National Stage filing under 35 U.S.C. 371 of International Application No. PCT/KR2019/000948, filed on Jan. 23, 2019, which claims the benefit of earlier filing date and right of priority to Korean Application No. 10-2018-0112897, filed on Sep. 20, 2018, and also claims the benefit of U.S. Provisional Application No. 62/621,476, filed on Jan. 24, 2018, the contents of which are all incorporated by reference herein in their entirety.

TECHNICAL FIELD

The present disclosure relates to a method of transmitting and receiving a random access channel and an uplink channel in an unlicensed band and apparatus therefor, and more particular, to a method of determining a timing advance value for transmitting and receiving a random access channel and an uplink channel in an unlicensed band and a transmission time based on the timing advance value and apparatus therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

The object of the present disclosure is to provide a method of transmitting and receiving a random access channel and an uplink channel in an unlicensed band and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of transmitting, by a user equipment (UE), an uplink signal in an unlicensed band. The method may include performing a clear channel assessment (CCA) on the unlicensed band and transmitting the uplink signal in a specific slot based on a result obtained by performing the CCA. When the specific slot is a random access channel (RACH) slot, the uplink signal may be transmitted based on a default timing advance (TA) value for RACH signal transmission.

In this case, the uplink signal may be delayed and transmitted such that the boundary of a first symbol for transmitting the uplink signal is aligned with the boundary of a second symbol for receiving the uplink signal.

Additionally, a random signal may be transmitted during the delay.

Additionally, the random signal may be a cyclic prefix (CP).

Additionally, symbols capable of being transmitted after the boundary of the specific slot may not be transmitted due to the transmission of the uplink signal based on the default TA value.

Additionally, when the number of symbols capable of being transmitted after the boundary of the specific slot is greater than or equal to a threshold, the uplink signal may not be transmitted.

Additionally, the uplink signal may be transmitted based on a TA value for the uplink signal, but the uplink signal may not be transmitted during a time duration before a transmission start time based on the default TA value.

Additionally, the uplink signal may be transmitted based on a TA value for the uplink signal, and the first symbol related to a transmission start time based on the default TA value may be transmitted as a CP.

Additionally, the CP length of the first symbol of the uplink channel may be equal to the CP length of a RACH preamble related to the RACH slot.

In another aspect of the present disclosure, provided is a communication device for transmitting an uplink signal in an unlicensed band. The communication device may include a memory and a processor connected to the memory. The processor may be configured to perform a CCA on the unlicensed band and transmit the uplink signal in a specific slot based on a result obtained by performing the CCA. When the specific slot is a RACH slot, the uplink signal may be transmitted based on a default TA value for RACH signal transmission.

In a further aspect of the present disclosure, provided is a method of receiving, by a base station, an uplink signal in an unlicensed band. The method may include determining a reception duration for receiving the uplink signal in a RACH slot and receiving the uplink signal within the determined reception duration. The reception duration may be determined based on a default TA value for RACH signal transmission.

Advantageous Effects

According to the present disclosure, a collision between a random access channel and an uplink channel in an unlicensed band may be minimized, thereby achieving efficient initial access.

It will be appreciated by persons skilled in the art that the effects that can be achieved with the present disclosure are not limited to what has been particularly described hereinabove and other effects of the present disclosure will be more clearly understood from the following detailed description taken in conjunction with the accompanying drawings.

DESCRIPTION OF DRAWINGS

FIG. 1 is a diagram for structures of control and user planes of radio interface protocol between a 3GPP radio access network standard-based user equipment and E-UTRAN.

FIG. 5 illustrates the configuration/format of a RACH preamble and the function of a receiver.

FIG. 14 is a diagram for explaining problems occurring when a physical uplink shared channel/physical uplink control channel (PUSCH/PUCCH) and a random access channel (RACH) are transmitted as in the prior art.

FIGS. 24 to 27 are diagrams for explaining methods of transmitting a PUSCH/PUCCH according to embodiments of the present disclosure.

BEST MODE

Figure 2:
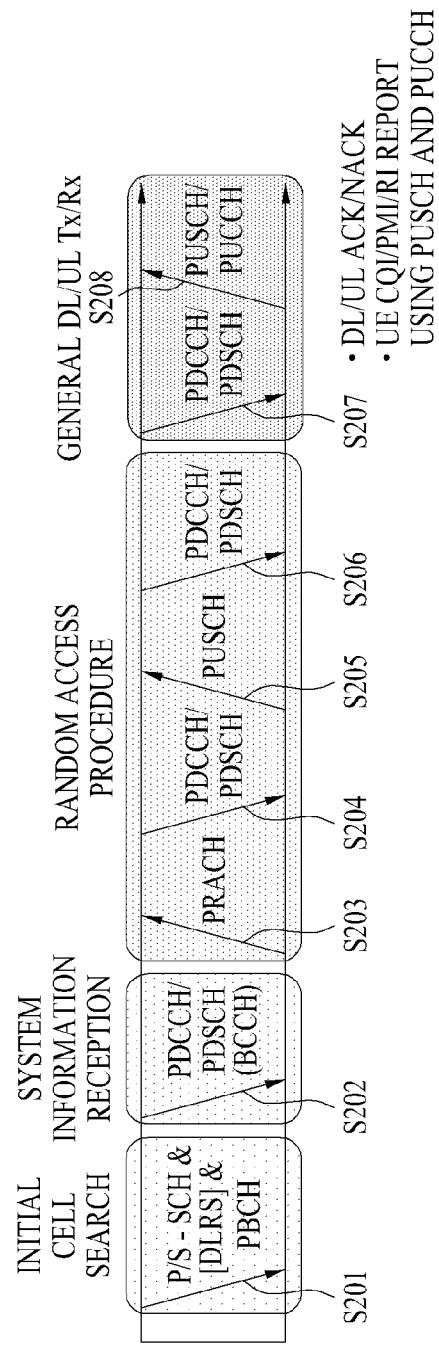
FIG. 2 is a diagram for explaining physical channels used for 3GPP system and a general signal transmission method using the physical channels.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

While embodiments of the present disclosure are described in the context of Long Term Evolution (LTE), LTE-Advanced (LTE-A), and New Radio (NR) systems, they are purely exemplary. Therefore, the embodiments of the present disclosure are applicable to any other communication system as long as the above definitions are valid for the communication system.

The term 'Base Station (BS)' may be used to cover the meanings of terms including Remote Radio Head (RRH), evolved Node B (eNB or eNode B), Reception Point (RP), relay, etc.

3GPP-based communication standards defines downlink physical channels corresponding to resource elements carrying information derived from a higher layer and downlink physical signals corresponding to resource elements which are used by a physical layer and do not carry the information derived from the higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid automatic repeat request indicator channel (PHICH) are defined as the downlink physical channels, and a reference signal and a synchronization signal are defined as the downlink physical signals. A reference signal (RS), also called a pilot signal, refers to a predefined signal with a specific waveform known to both a gNB and a user equipment (UE). For example, a cell-specific RS (CRS), a UE-specific RS (UE-RS), a positioning RS (PRS), and a channel state information RS (CSI-RS) may be defined as downlink RSs. In addition, the 3GPP LTE/LTE-A standards define uplink physical channels corresponding to resource elements carrying information derived from a higher layer and uplink physical signals corresponding to resource elements which are used by a physical layer and do not carry the information derived from the higher layer. For example, a physical uplink shared channel (PUSCH), a physical uplink control channel (PUCCH), and a physical random access channel (PRACH) are defined as the uplink physical channels, and a demodulation reference signal (DM-RS) for an uplink control/data signal and a sounding reference signal (SRS) for uplink channel measurement are defined as the uplink physical signals.

In the present disclosure, the PDCCH refers to a set of time-frequency resources or resource elements carrying downlink control information (DCI), the PCFICH refers to a set of time-frequency resources or resource elements carrying a control format indicator (CFI), the PHICH refers to a set of time-frequency resources or resource elements carrying a downlink acknowledgement/negative acknowledgement (ACK/NACK), and the PDSCH refers to as a set of time-frequency resources or resource elements carrying downlink data. In addition, the PUCCH refers to a set of time-frequency resources or resource elements carrying uplink control information (UCI), the PUSCH refers to a set of time-frequency resources or resource elements carrying uplink data, and the PRACH refers to a set of time-frequency resources or resource elements carrying a random access signal. In particular, in the present disclosure, a time-frequency resource or a resource element (RE) allocated to or belonging to the PDCCH/PCFICH/PHICH/PDSCH/PUCCH/PUSCH/PRACH is referred to as a PDCCH/PCFICH/PHICH/PDS CH/PUCCH/PUSCH/PRACH RE or a PDCCH/PCFICH/PHICH/PDSCH/PUCCH/PUSCH/PRACH resource. Thus, when it is said that a UE transmits the PUCCH/PUSCH/PRACH, it may be interpreted to mean that the UE transmits the UCI/uplink data/random access signal on the PUS CH/PUCCH/PRACH. When it is said that a gNB transmits the PDCCH/PCFICH/PHICH/PDSCH, it may be interpreted to mean that the gNB transmits the downlink data/DCI on the PDCCH/PCFICH/PHICH/PDSCH.

In the following, an orthogonal frequency division multiplexing (OFDM) symbol/subcarrier/RE where the CRS/DM-RS/CSI-RS/SRS/UE-RS is allocated or configured is referred to as a CRS/DM-RS/CSI-RS/SRS/UE-RS symbol/carrier/subcarrier/RE. For example, an OFDM symbol where a tracking RS (TRS) is allocated or configured is referred to as a TRS symbol, a subcarrier where which the TRS is allocated or configured is referred to as a TRS subcarrier, and an RE where which the TRS is allocated or configured is referred to as a TRS RE. In addition, a subframe configured for TRS transmission is referred to as a TRS subframe. Further, a subframe in which a broadcast signal is transmitted is referred to as a broadcast subframe or a PBCH subframe, and a subframe in which a synchronization signal (e.g., a primary synchronization signal (PSS) and/or a secondary synchronization signal (SSS)) is transmitted is referred to a synchronization signal subframe or a PSS/SSS subframe. An OFDM symbol/subcarrier/RE where the PSS/SSS is allocated or configured is referred to as a PSS/SSS symbol/subcarrier/RE.

In the present disclosure, a CRS port, a UE-RS port, a CSI-RS port, and a TRS port refer to an antenna port configured to transmit the CRS, an antenna port configured to transmit the UE-RS, an antenna port configured to transmit the CSI-RS, and an antenna port configured to transmit the TRS, respectively. Antenna ports configured to transmit the CRS may be distinguished from each other by the location of REs occupied by the CRS, which depends on the CRS ports. Antenna ports configured to transmit the CRS may be distinguished from each other by the location of REs occupied by the CRS, which depends on the CRS ports. Antenna ports configured to transmit the UE-RS may be distinguished from each other by the location of REs occupied by the UE-RS, which depends on the UE-RS ports. Antenna ports configured to transmit the CSI-RS may be distinguished from each other by the location of REs occupied by the CSI-RS, which depends on the CSI-RS ports. Therefore, the term 'CRS/UE-RS/CSI-RS/TRS port' may also be used to indicate a pattern of REs occupied by the CRS/UE-RS/CSI-RS/TRS in a predetermined resource region.

FIG. 1 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a Physical Random Access Channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a Physical Uplink Shared Channel (PUSCH) and/or a Physical Uplink Control Channel (PUCCH) to the eNB (S208), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 3:
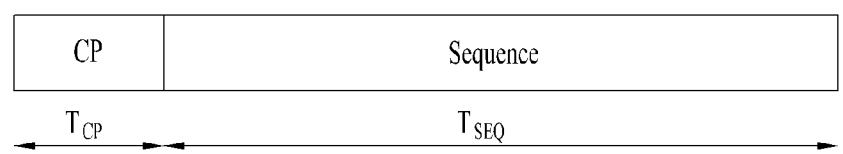
FIG. 3 illustrates an example of a random access preamble format in a legacy LTE/LTE-A system.

FIG. 3 illustrates a random access preamble format in a legacy LTE/LTE-A system.

In the legacy LTE/LTE-A system, a random access preamble, i.e., a RACH preamble, includes a cyclic prefix having a length $T_{CP}$ and a sequence part having a length $T_{SEQ}$ in a physical layer. The parameter values $T_{CP}$ and $T_{SEQ}$ are listed in the following table, and depend on the frame structure and the random access configuration. Higher layers control the preamble format. In the 3GPP LTE/LTE-A system, PRACH configuration information is signaled through system information and mobility control information of a cell. The PRACH configuration information indicates a root sequence index, a cyclic shift unit $N_{CS}$ of a Zadoff-Chu sequence, the length of the root sequence, and a preamble format, which are to be used for a RACH procedure in the cell. In the 3GPP LTE/LTE-A system, a PRACH opportunity, which is a timing at which the preamble format and the RACH preamble may be transmitted, is indicated by a PRACH configuration index, which is a part of the RACH configuration information (refer to Section 5.7 of 3GPP TS 36.211 and "PRACH-Config" of 3GPP TS 36.331). The length of the Zadoff-Chu sequence used for the RACH preamble is determined according to the preamble format (refer to Table 4)

TABLE 1

| Preamble format | $T_{CP}$ | $T_{SEQ}$ |
| --- | --- | --- |
| 0 | 3168 · $T_s$ | 24576 · $T_s$ |
| 1 | 21024 · $T_s$ | 24576 · $T_s$ |
| 2 | 6240 · $T_s$ | 2 · 24576 · $T_s$ |
| 3 | 21024 · $T_s$ | 2 · 24576 · $T_s$ |
| 4 | 448 · $T_s$ | 4096 · $T_s$ |

In the LTE/LTE-A system, the RACH preamble is transmitted in a UL subframe. The transmission of a random access preamble is restricted to certain time and frequency resources. These resources are called PRACH resources, and enumerated in increasing order of the subframe number within the radio frame and the PRBs in the frequency domain such that index 0 correspond to the lowest numbered PRB and subframe within the radio frame. Random access resources are defined according to the PRACH configuration index (refer to the standard document of 3GPP TS 36.211). The PRACH configuration index is given by a higher layer signal (transmitted by an eNB). The sequence part of the RACH preamble (hereinafter, preamble sequence) uses a Zadoff-Chu sequence. The preamble sequences for RACH are generated from Zadoff-Chu sequences with zero correlation zone, generated from one or several root Zadoff-Chu sequences. The network configures the set of preamble sequences the UE is allowed to use. In the legacy LTE/LTE-A system, there are 64 preambles available in each cell. The set of 64 preamble sequences in a cell is found by including first, in the order of increasing cyclic shift, all the available cyclic shifts of a root Zadoff-Chu sequence with the logical index RACH_ROOT_SEQUENCE, where RACH_ROOT_SEQUENCE is broadcasted as part of the system information. Additional preamble sequences, in case 64 preambles cannot be generated from a single root Zadoff-Chu sequence, are obtained from the root sequences with the consecutive logical indexes until all the 64 sequences are found. The logical root sequence order is cyclic: the logical index 0 is consecutive to 837. The relation between a logical root sequence index and physical root sequence index u is given by Table 2 and Table 3 for preamble formats 0~3 and 4, respectively.

TABLE 2

| Logical root sequence number | Physical root sequence number u (in increasing order of the corresponding logical sequence number) |
| --- | --- |
| 0~23 | 129, 710, 140, 699, 120, 719, 210, 629, 168, 671, 84, 755, 105, 734, 93, 746, 70, 769, 60, 779, 2, 837, 1, 838 |
| 24~29 | 56, 783, 112, 727, 148, 691 |
| 30~35 | 80, 759, 42, 797, 40, 799 |
| 36~41 | 35, 804, 73, 766, 146, 693 |
| 42~51 | 31, 808, 28, 811, 30, 809, 27, 812, 29, 810 |
| 52~63 | 24, 815, 48, 791, 68, 771, 74, 765, 178, 661, 136, 703 |
| 64~75 | 86, 753, 78, 761, 43, 796, 39, 800, 20, 819, 21, 818 |
| 76~89 | 95, 744, 202, 637, 190, 649, 181, 658, 137, 702, 125, 714, 151, 688 |
| 90~115 | 217, 622, 128, 711, 142, 697, 122, 717, 203, 636, 118, 721, 110, 729, 89, 750, 103, 736, 61, 778, 55, 784, 15, 824, 14, 825 |
| 116~135 | 12, 827, 23, 816, 34, 805, 37, 802, 46, 793, 207, 632, 179, 660, 145, 694, 130, 709, 223, 616 |
| 136~167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168~203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204~263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264~327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328~383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384~455 | 3, 836, 19, 820, 22, 817, 41, 798, 38, 801, 44, 795, 52, 787, 45, 794, 63, 776, 67, 772, 72, 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456~513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514~561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| 562~629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630~659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| 660~707 | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| 708~729 | 346, 493, 339, 500, 351, 488, 306, 533, 289, 550, 400, 439, 378, 461, 374, 465, 415, 424, 270, 569, 241, 598 |
| 730~751 | 231, 608, 260, 579, 268, 571, 276, 563, 409, 430, 398, 441, 290, 549, 304, 535, 308, 531, 358, 481, 316, 523 |
| 752~765 | 293, 546, 288, 551, 284, 555, 368, 471, 253, 586, 256, 583, 263, 576 |

TABLE 2-continued

| Logical root sequence number | Physical root sequence number u (in increasing order of the corresponding logical sequence number) |
|---|---|
| 766~777 | 242, 597, 274, 565, 402, 437, 383, 456, 357, 482, 329, 510 |
| 778~789 | 317, 522, 307, 532, 286, 553, 287, 552, 266, 573, 261, 578 |
| 790~795 | 236, 603, 303, 536, 356, 483 |
| 796~803 | 355, 484, 405, 434, 404, 435, 406, 433 |
| 804~809 | 235, 604, 267, 572, 302, 537 |
| 810~815 | 309, 530, 265, 574, 233, 606 |
| 816~819 | 367, 472, 296, 543 |
| 820~837 | 336, 503, 305, 534, 373, 466, 280, 559, 279, 560, 419, 420, 240, 599, 258, 581, 229, 610 |

TABLE 3

| Logical root sequence number | Physical root sequence number u (in increasing order of the corresponding logical sequence number) | | | | | | | | | | | | | | | | | | | |
|---|---|---|---|---|---|---|---|---|---|---|---|---|---|---|---|---|---|---|---|---|
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |
| 138-837 | | | | | | | | | | N/A | | | | | | | | | | |

A u-th root Zadoff-Chu sequence is defined by the following equation.

$$x_u(n) = e^{-j\frac{\pi u n(n+1)}{N_{ZC}}}, 0 \leq n \leq N_{ZC} - 1 \quad \text{[Equation 1]}$$

The length of the Zadoff-Chu sequence $N_{ZC}$ is given as shown in Table 4 below.

TABLE 4

| Preamble format | $N_{ZC}$ |
|---|---|
| 0~3 | 839 |
| 4 | 139 |

From the u-th root Zadoff-Chu sequence, random access preambles with zero correlation zones of length $N_{ZC}-1$ are defined by cyclic shifts according to $x_{u,v}(n)=x_u((n+C_v) \bmod N_{ZC})$, where the cyclic shift is given by the following equation.

$$C_v = \begin{cases} vN_{CS} & v = 0, 1, \ldots, \lfloor N_{ZC}/N_{CS} \rfloor - 1, N_{CS} \neq 0 & \text{for unrestricted sets} \\ 0 & N_{CS} = 0 & \text{for unrestricted sets} \\ d_{start}\lfloor v/n_{shift}^{RA} \rfloor + (v \bmod n_{shift}^{RA})N_{CS} & v = 0, 1, \ldots, n_{shift}^{RA} n_{group}^{RA} + \bar{n}_{shift}^{RA} - 1 & \text{for restricted sets} \end{cases} \quad \text{[Equation 2]}$$

$N_{CS}$ is given by Table 5 for preamble formats 0~3 and by Table 6 for preamble format 4.

TABLE 5

| | $N_{CS}$ value | |
|---|---|---|
| zeroCorrelationZoneConfig | Unrestricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |

TABLE 5-continued

| | $N_{CS}$ value | |
|---|---|---|
| zeroCorrelationZoneConfig | Unrestricted set | Restricted set |
| 10 | 76 | 100 |
| 11 | 93 | 128 |
| 12 | 119 | 158 |
| 13 | 167 | 202 |
| 14 | 279 | 237 |
| 15 | 419 | — |

TABLE 6

| zeroCorrelationZoneConfig | $N_{CS}$ value |
|---|---|
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |
| 9 | N/A |
| 10 | N/A |
| 11 | N/A |
| 12 | N/A |
| 13 | N/A |
| 14 | N/A |
| 15 | N/A |

The parameter zeroCorrelationZoneConfig is provided by higher layers. The parameter High-speed-flag provided by higher layers determines if unrestricted set or restricted set shall be used. The variable $d_u$ is the cyclic shift corresponding to a Doppler shift of magnitude $1/T_{SEQ}$ and is given by the following equation.

$$d_u = \begin{cases} p & 0 \le p < N_{ZC}/2 \\ N_{ZC} - p & \text{otherwise} \end{cases} \quad \text{[Equation 3]}$$

p is the smallest non-negative integer that fulfils (pu) mod $N_{ZC}=1$. The parameters for restricted sets of cyclic shifts depend on $d_u$. For $N_{ZC} \le d_u < N_{ZC}3$, the parameters are given by the following equation.

$$n_{shift}^{RA} = \lfloor d_u/N_{CS} \rfloor$$

$$d_{start} = 2d_u + n_{shift}^{RA} N_{CS}$$

$$n_{group}^{RA} = \lfloor N_{ZC}/d_{start} \rfloor$$

$$\bar{n}_{shift}^{RA} = \max(\lfloor (N_{ZC} - 2d_u - n_{group}^{RA} d_{start})/N_{CS} \rfloor, 0) \quad \text{[Equation 4]}$$

For $N_{ZC}/3 \le d_u < (N_{ZC} - N_{CS})/2$, the parameters are given by the following equation.

$$n_{shift}^{RA} = \lfloor (N_{ZC} - 2d_u)/N_{CS} \rfloor$$

$$d_{start} = N_{ZC} - 2d_u + n_{shift}^{RA} N_{CS}$$

$$n_{group}^{RA} = \lfloor d_u/d_{start} \rfloor$$

$$\bar{n}_{shift}^{RA} = \min(\max(\lfloor (d_u - n_{group}^{RA} d_{start})/N_{CS} \rfloor, 0), n_{shift}^{RA}) \quad \text{[Equation 5]}$$

For all other values of $d_u$, there are no cyclic shifts in the restricted set.

The time-continuous random access signal s(t) which is the baseband signal of RACH is defined by the following Equation.

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})} \quad \text{[Equation 6]}$$

where $0 \le t < T_{SEQ} - T_{CP}$, $\beta_{PRACH}$ is an amplitude scaling factor in order to conform to the transmit power specified in 3GPP TS 36.211, and $k_0 = n^{RA}_{PRB} N^{RB}_{sc} - N^{UL}_{RB} N^{RB}_{sc}/2$. $N^{RB}_{sc}$ denotes the number of subcarriers constituting one resource block (RB). $N^{UL}_{RB}$ denotes the number of RBs in a UL slot and depends on a UL transmission bandwidth. The location in the frequency domain is controlled by the parameter $n^{RA}_{PRB}$ is derived from the section 5.7.1 of 3GPP TS 36.211. The factor $K = \Delta f/\Delta f_{RA}$ accounts for the difference in subcarrier spacing between the random access preamble and uplink data transmission. The variable $\Delta f_{RA}$, the subcarrier spacing for the random access preamble, and the variable $\varphi$, a fixed offset determining the frequency-domain location of the random access preamble within the physical resource blocks, are both given by the following table.

TABLE 7

| Preamble format | $\Delta f_{RA}$ | $\varphi$ |
|---|---|---|
| 0~3 | 1250 Hz | 7 |
| 4 | 7500 Hz | 2 |

Figure 4:
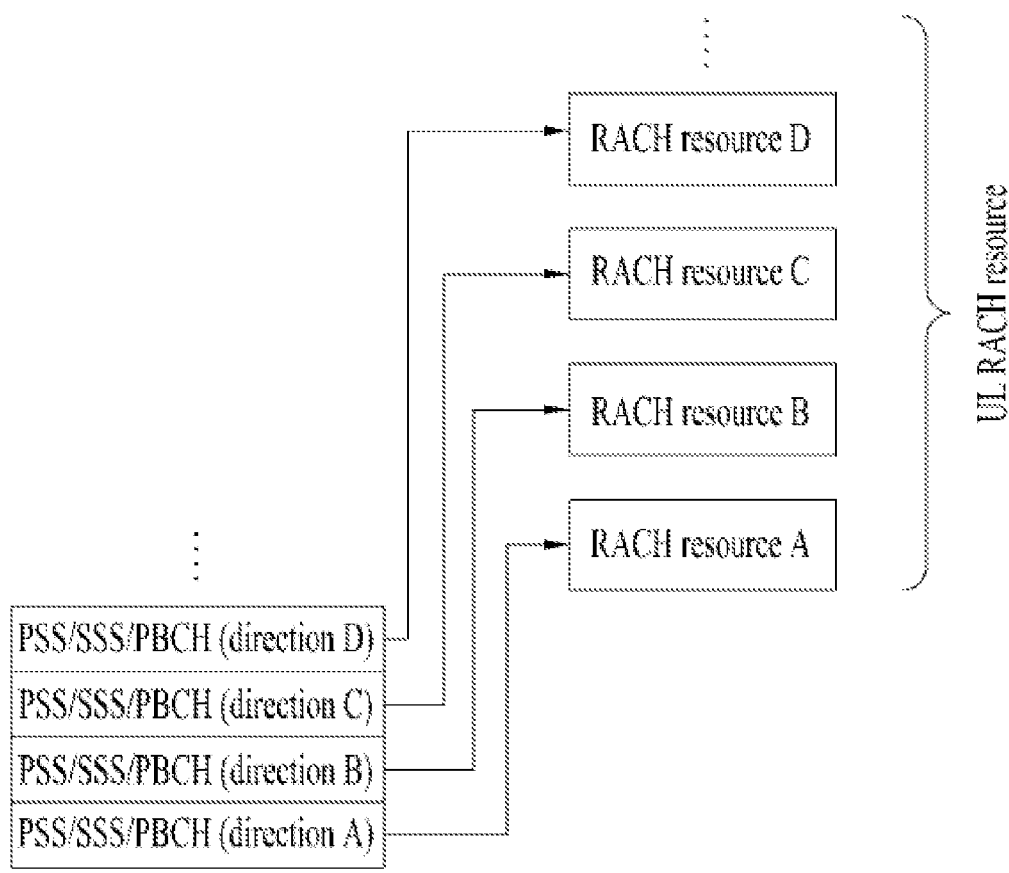
FIG. 4 illustrates transmission of a synchronization signal (SS) block and a random access channel (RACH) resource linked to the SS block.

In the LTE/LTE-A system, a subcarrier spacing $\Delta f$ is 15 kHz or 7.5 kHz. However, as given by Table 7, a subcarrier spacing $\Delta f_{RA}$ for a random access preamble is 1.25 kHz or 0.75 kHz. FIG. 4 illustrates transmission of an SS block and a RACH resource linked to the SS block.

To communicate with one UE, the gNB should acquire an optimal beam direction between the gNB and the UE and should continuously track the optimal beam direction because the optimal beam direction is changed as the UE moves. A procedure of acquiring the optimal beam direction between the gNB and the UE is referred to as a beam acquisition procedure and a procedure of continuously tracking the optimal beam direction is referred to as a beam tracking procedure. The beam acquisition procedure is needed for 1) initial access in which the UE first attempts to access the gNB, 2) handover in which the UE is handed over from one gNB to another gNB, or 3) beam recovery for recovering from a state in which the UE and gNB cannot maintain an optimal communication state or enter a communication impossible state, i.e., beam failure, as a result of losing an optimal beam while performing beam tracking for searching for the optimal beam between the UE and the gNB.

In the new RAT (NR) system, which is under development, a multi-stage beam acquisition procedure is under discussion, for beam acquisition in an environment using multiple beams. In the multi-stage beam acquisition procedure, the gNB and the UE perform connection setup using a wide beam in an initial access stage and, after connection setup is ended, the gNB and the UE perform communication with optimal quality using a narrow band. In the present disclosure, although various methods for beam acquisition of the NR system are mainly discussed, the most actively discussed method at present is as follows.

1) The gNB transmits an SS block per wide beam in order for the UE to search for the gNB in an initial access procedure, i.e., performs cell search or cell acquisition, and to search for an optimal wide beam to be used in a first stage of beam acquisition by measuring channel quality of each wide beam. 2) The UE performs cell search for an SS block per beam and performs DL beam acquisition using a cell detection result of each beam. 3) The UE performs a RACH procedure in order to inform the gNB that the UE will access the gNB that the UE has discovered. 4) The gNB connects or associates the SS block transmitted per beam and a RACH resource to be used for RACH transmission, in order to cause the UE to inform the gNB of a result of the RACH procedure and simultaneously a result of DL beam acquisition (e.g., beam index) at a wide beam level. If the UE performs the RACH procedure using a RACH resource connected to an optimal beam direction that the UE has discovered, the gNB obtains information about a DL beam suitable for the UE in a procedure of receiving a RACH preamble.

<Beam Correspondence (BC)>

In a multi-beam environment, whether a UE and/or a TRP can accurately determine a transmission (Tx) or reception (Rx) beam direction between the UE and the TRP is problematic. In the multi-beam environment, signal transmission repetition or beam sweeping for signal reception may be considered according to a Tx/Rx reciprocal capability of the TRP (e.g., eNB) or the UE. The Tx/Rx reciprocal capability is also referred to as Tx/Rx beam correspondence (BC) in the TRP and the UE. In the multi-beam environment, if the Tx/Rx reciprocal capability in the TRP or the UE does not hold, the UE may not transmit a UL signal in a beam direction in which the UE has received a DL signal because an optimal path of UL may be different from an optimal path of DL. Tx/Rx BC in the TRP holds, if the TRP can determine a TRP Rx beam for UL reception based on DL measurement of UE for one or more Tx beams of the TRP and/or if the TRP can determine a TRP Tx beam for DL transmission based on UL measurement for one or more Rx beams of the TRP. Tx/Rx BC in the UE holds if the UE can determine a UE Rx beam for UL transmission based on DL measurement of UE for one or more Rx beams of the UE and/or if the UE can determine a UE Tx beam for DL reception according to indication of the TRP based on UL measurement for one or more Tx beams of the UE.

In the LTE system and the NR system, a RACH signal used for initial access to the gNB, i.e., initial access to the gNB through a cell used by the gNB, may be configured using the following elements.

* Cyclic prefix (CP): This element serves to prevent interference generated from a previous/front (orthogonal frequency division multiplexing (OFDM)) symbol and group RACH preamble signals arriving at the gNB with various time delays into one time zone. That is, if the CP is configured to match a maximum radius of a cell, RACH preambles that UEs in the cell have transmitted in the same resource are included in a RACH reception window corresponding to the length of RACH preambles configured by the gNB for RACH reception. A CP length is generally set to be equal to or greater than a maximum round trip delay.

* Preamble: A sequence used by the gNB to detect signal transmission is defined and the preamble serves to carry this sequence.

* Guard time (GT): This element is defined to cause a RACH signal arriving at the gNB with delay from the farthest distance from the gNB on RACH coverage not to create interference with respect to a signal arriving after a RACH symbol duration. During this GT, the UE does not transmit a signal so that the GT may not be defined as the RACH signal.

FIG. 5 illustrates configuration/format of a RACH preamble and a receiver function.

The UE transmits a RACH signal through a designated RACH resource at a system timing of the gNB obtained through an SS. The gNB receives signals from multiple UEs. Generally, the gNB performs the procedure illustrated in FIG. 5 for RACH signal reception. Since a CP for the RACH signal is set to a maximum round trip delay or more, the gNB may configure an arbitrary point between the maximum round trip delay and the CP length as a boundary for signal reception. If the boundary is determined as a start point for signal reception and if correlation is applied to a signal of a length corresponding to a sequence length from the start point, the gNB may acquire information as to whether the RACH signal is present and information about the CP.

If a communication environment operated by the gNB such as a millimeter band uses multiple beams, the RACH signal arrives at the eNB from multiple directions and the gNB needs to detect the RACH preamble (i.e., PRACH) while sweeping beam directions to receive the RACH signal arriving from multiple directions. As mentioned above, when analog BF is used, the gNB performs RACH reception only in one direction at one timing. For this reason, it is necessary to design the RACH preamble and a RACH procedure so that the gNB may properly detect the RACH preamble. The present disclosure proposes the RACH preamble and/or the RACH procedure for a high frequency band to which the NR system, especially, BF, is applicable in consideration of the case in which BC of the gNB holds and the case in which BC does not hold.

Figure 6:
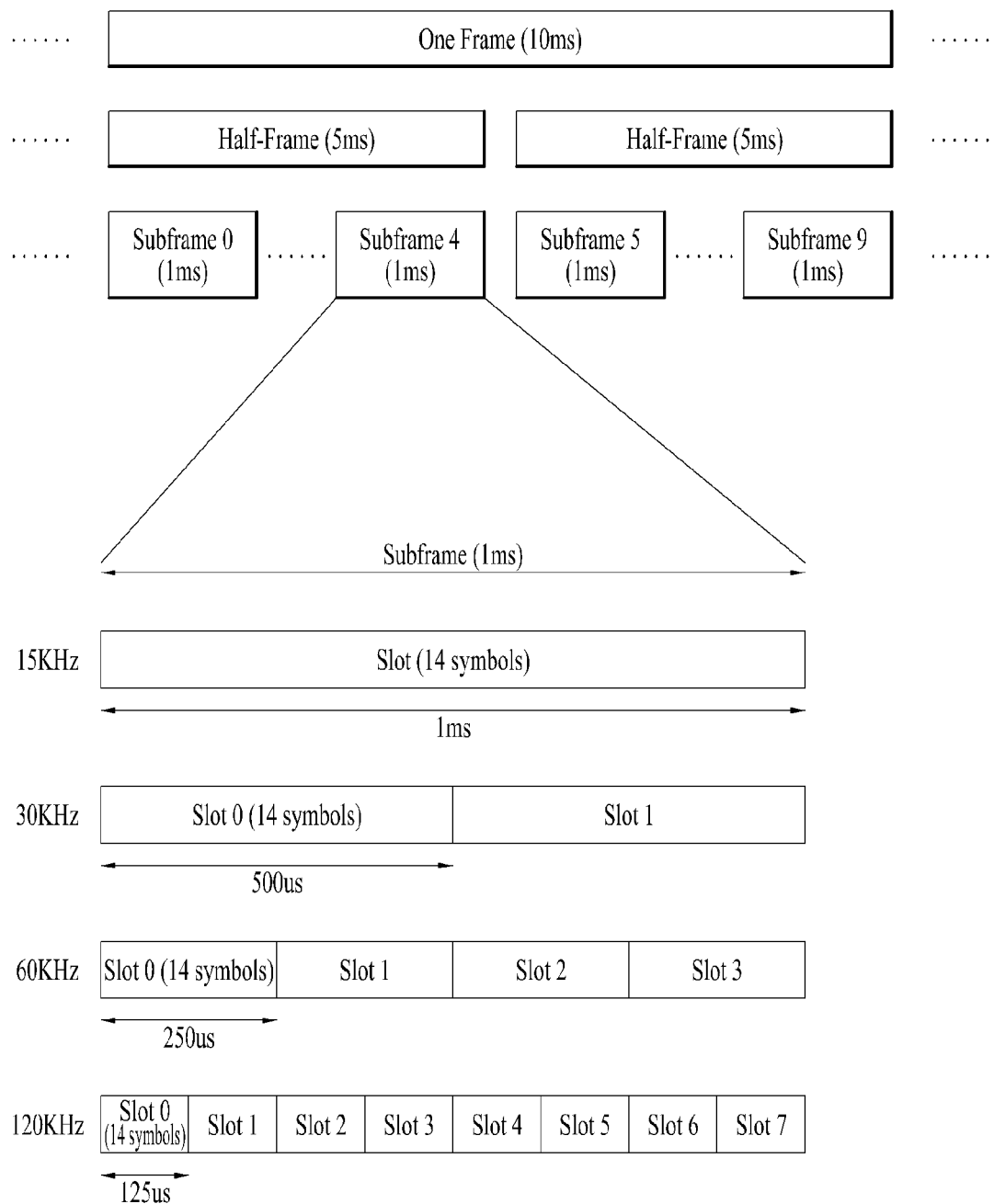
FIGS. 6 to 8 are diagrams for explaining the structures of a radio frame and a slot used in a new radio access technology (NR) system.

FIG. 6 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 8 illustrates that the number of symbols per slot, the number of slots per frame, and the number of slots per subframe vary according to the SCS when the normal CP is used.

TABLE 8

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{subframe,u}_{slot}$: Number of slots in a subframe * $N^{slot}_{symb}$: Number of symbols in a slot
* $N^{frame,u}_{slot}$: Number of slots in a frame Table 9 illustrates that the number of symbols per slot, the number of slots per frame, and the number of slots per subframe vary according to the SCS when the extended CP is used.

TABLE 9

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

Figure 7:
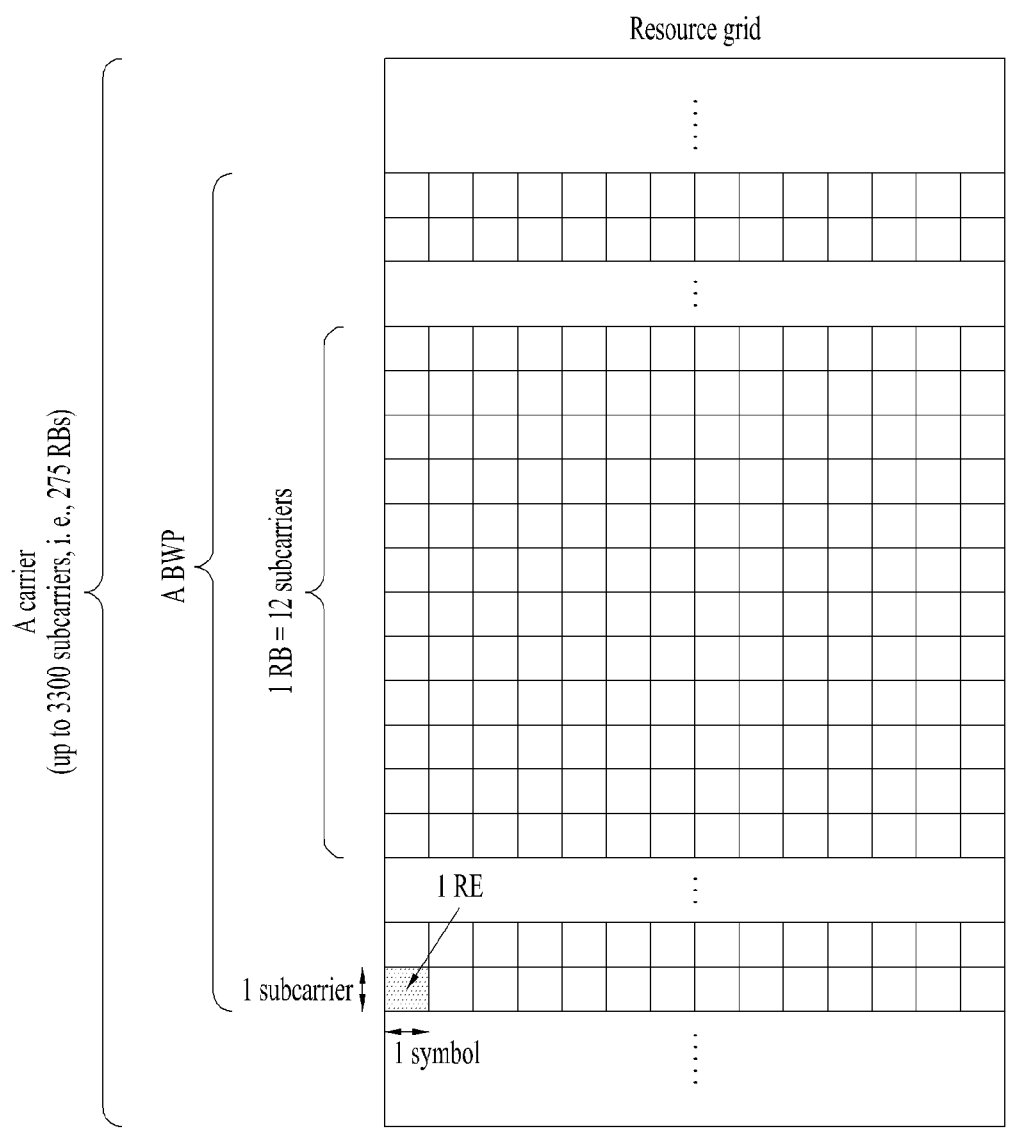
Figure 8:
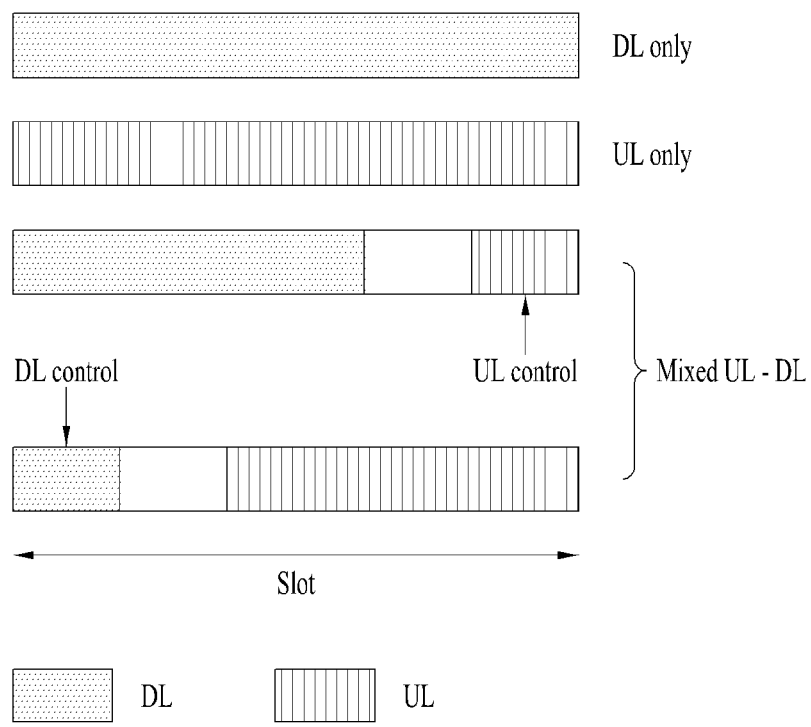

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 7 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto. FIG. 8 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL Only configuration
2. UL only configuration
3. Mixed UL-DL configuration
   –DL region+Guard period (GP)+UL control region
   –DL control region+GP+UL region
   * DL region: (i) DL data region, (ii) DL control region+DL data region
   * UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The guard period (GP) provides a time gap in the process of the UE switching from the transmission mode to the reception mode or from the reception mode to the transmission mode. Some symbols at the time of switching from DL to UL within a subframe may be configured as the GP.

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lambda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Digital BF performs signal processing on a digital baseband signal that is to be transmitted or is received as mentioned above, and therefore it may transmit or receive signals in multiple directions at the same time using multiple beams. In contrast, analog BF performs beamforming with a received analog signal or an analog signal to be transmitted in a modulated state, and therefore it cannot simultaneously transmit or receive signals in multiple directions beyond the range covered by one beam. In general, a gNB communicates with multiple users at the same time using broadband transmission or multi-antenna characteristics. When the gNB uses analog or hybrid BF and forms an analog beam in one beam direction, the gNB is allowed to communicate only with users included in the same analog beam direction due to the characteristics of analog BF. A RACH resource allocation scheme and a scheme of resource utilization in the gNB according to the present disclosure to be described later are proposed in consideration of constraints resulting from the characteristics of analog BF or hybrid BF.

Figure 9:
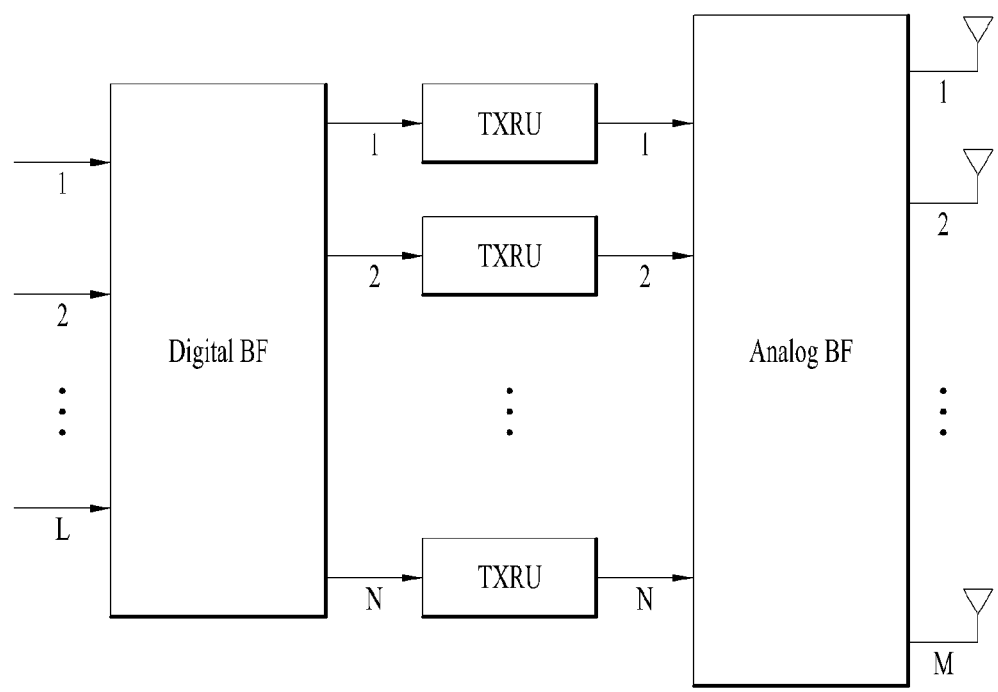
FIG. 9 abstractly illustrates a hybrid beamforming structure in terms of transceiver units (TXRUs) and physical antennas.

FIG. 9 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 9, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, the introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 10:
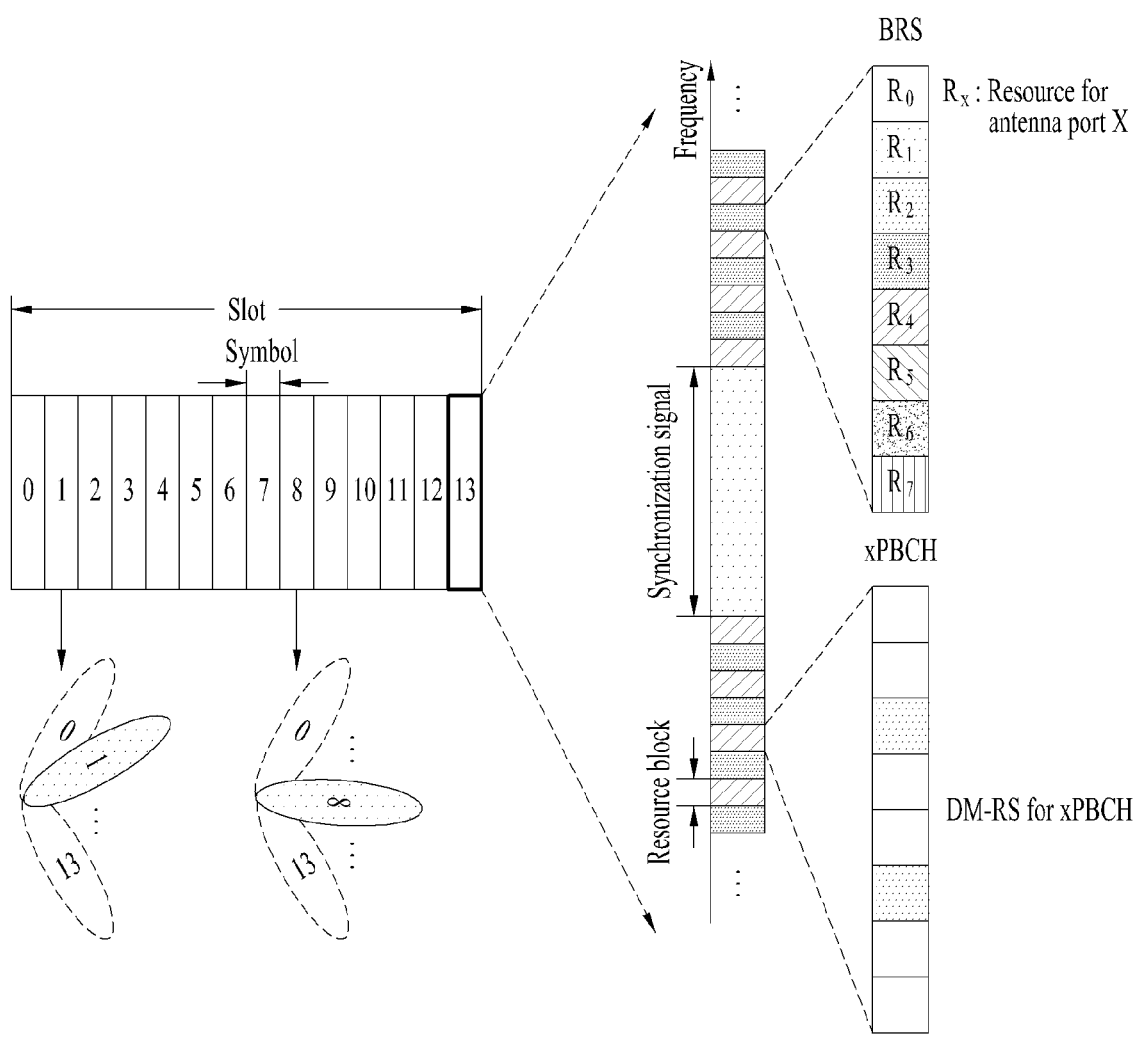
FIG. 10 illustrates beam sweeping operation for SSs and system information in a downlink transmission process

FIG. 10 is a view illustrating beam sweeping for an SS and system information during DL transmission. In FIG. 10, a physical resource or a physical channel for broadcasting system information of the NR system is referred to as an xPBCH. Analog beams from different antenna panels may be transmitted simultaneously in one symbol, and the introduction of a beam reference signal (BRS), which is transmitted for a single analog beam corresponding to a specific antenna panel as illustrated in FIG. 10, is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 11:
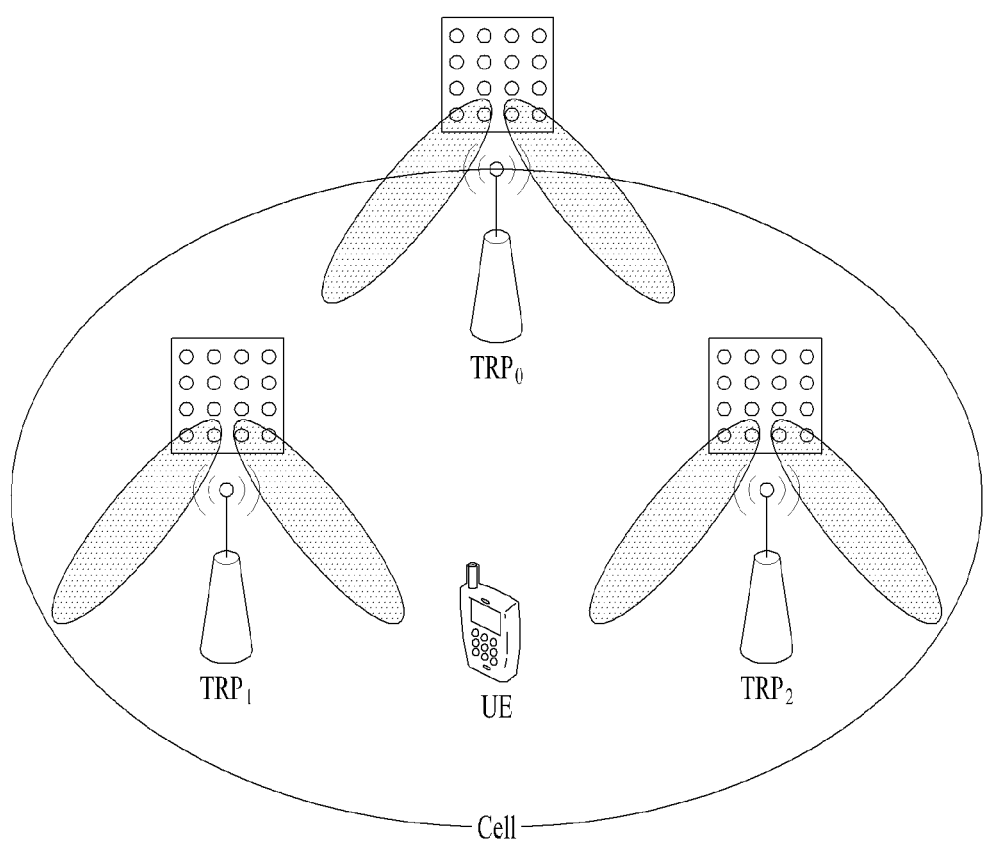
FIG. 11 illustrates a cell in the NR system.

FIG. 11 is a view illustrating an exemplary cell in the NR system.

Referring to FIG. 11, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Figure 12:
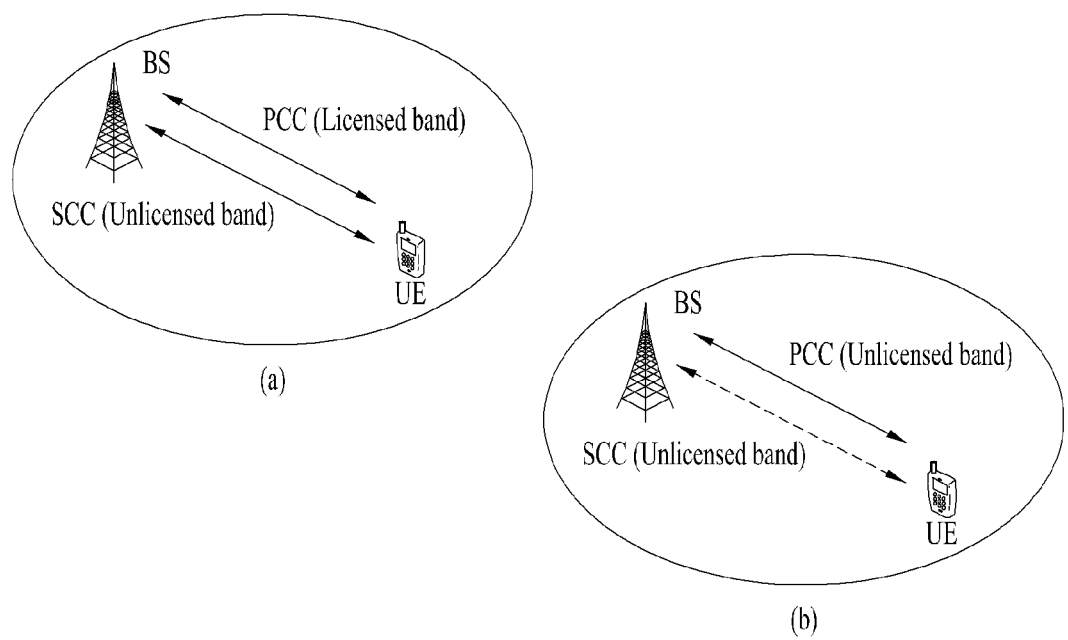
FIGS. 12 and 13 are diagrams for explaining uplink channel transmission in an unlicensed band.

FIG. 12 illustrates a wireless communication system supporting an unlicensed band applicable to the present disclosure.

Herein, a cell operating in a licensed band (L-band) is defined as an L-cell, and a carrier in the L-cell is defined as a (DL/UL) LCC. A cell operating in an unlicensed band (U-band) is defined as a U-cell, and a carrier in the U-cell is defined as a (DL/UL) UCC. The carrier/carrier-frequency of a cell may refer to the operating frequency (e.g., center frequency) of the cell. A cell/carrier (e.g., CC) is commonly called a cell.

Figure 17:
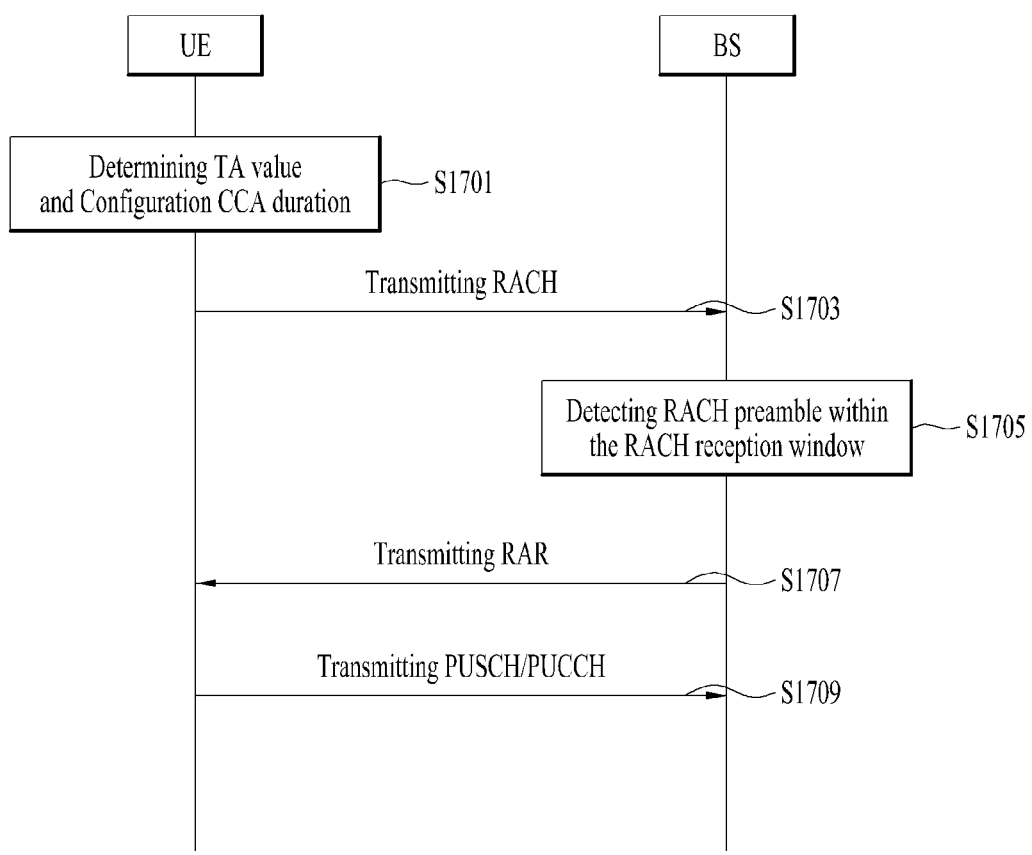

When a BS and a UE transmit and receive signals on an LCC and a UCC where carrier aggregation is applied as shown in FIG. 12 (a), the LCC and the UCC may be set to a primary CC (PCC) and a secondary CC (SCC), respectively. The BS and the UE may transmit and receive signals on one UCC or on a plurality of UCCs where carrier aggregation is applied as shown in FIG. 17 (b). In other words, the BS and UE may transmit and receive signals on UCC(s) with no LCC.

Signal transmission and reception operations in U-bands, which will be described later in the present disclosure, may be applied to all of the aforementioned deployment scenarios (unless specified otherwise).

The NR frame structure shown in FIG. 6 may be used for operation in a U-band. The configuration of OFDM symbols reserved for UL/DL signal transmission in a frame structure for the U-band may be determined by the BS. In this case, the OFDM symbol may be replaced with an SC-FDM(A) symbol.

For DL signal transmission in the U-band, the BS may inform the UE of the configuration of OFDM symbols used in subframe #n through signaling. Herein, a subframe may be replaced with a slot or a time unit (TU).

Specifically, in the LTE system supporting U-bands, the UE may assume (or recognize) the configuration of occupied OFDM symbols in subframe #n based on a specific filed in DCI (e.g., 'Subframe configuration for LAA' field, etc.), which is received in subframe #n-1 or subframe #n from the BS.

Table 10 shows how the 'Subframe configuration for LAA' field indicates the configuration of OFDM symbols used to transmit DL physical channels and/or physical signals in the current and/or next subframe.

TABLE 10

| Value of 'Subframe configuration for LAA' field in current subframe | Configuration of occupied OFDM symbols (current subframe, next subframe) |
| --- | --- |
| 0000 | (—, 14) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

For UL signal transmission in the U-band, the BS may provide information on a UL transmission interval to the UE through signaling.

Specifically, in the LTE system supporting U-bands, the UE may obtain 'UL duration' and 'UL offset' information on subframe #n from the 'UL duration and offset' field in detected DCI.

Table 11 shows how the 'UL duration and offset' field indicates the configurations of a UL offset and a UL duration.

TABLE 11

| Value of 'UL duration and offset' field | UL offset, l (in subframes) | UL duration, d (in subframes) |
| --- | --- | --- |
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

For example, when the 'UL duration and offset' field configures (or indicates) UL offset 1 and UL duration d for subframe #n, the UE may not need to receive DL physical channels and/or physical signals in subframe #n+1+i (where i=0, 1, . . . , d−1).

The UE may perform a contention-based channel access procedure (CAP) for the UL signal transmission in the U-band. Specifically, the UE may perform a Type 1 CAP or a Type 2 CAP for the UL signal transmission in the U-band. In general, the UE may perform a CAP configured by the UE for the UL signal transmission (e.g., Type 1 CAP or Type 2 CAP).

(1) Type 1 UL CAP Method

Figure 13:
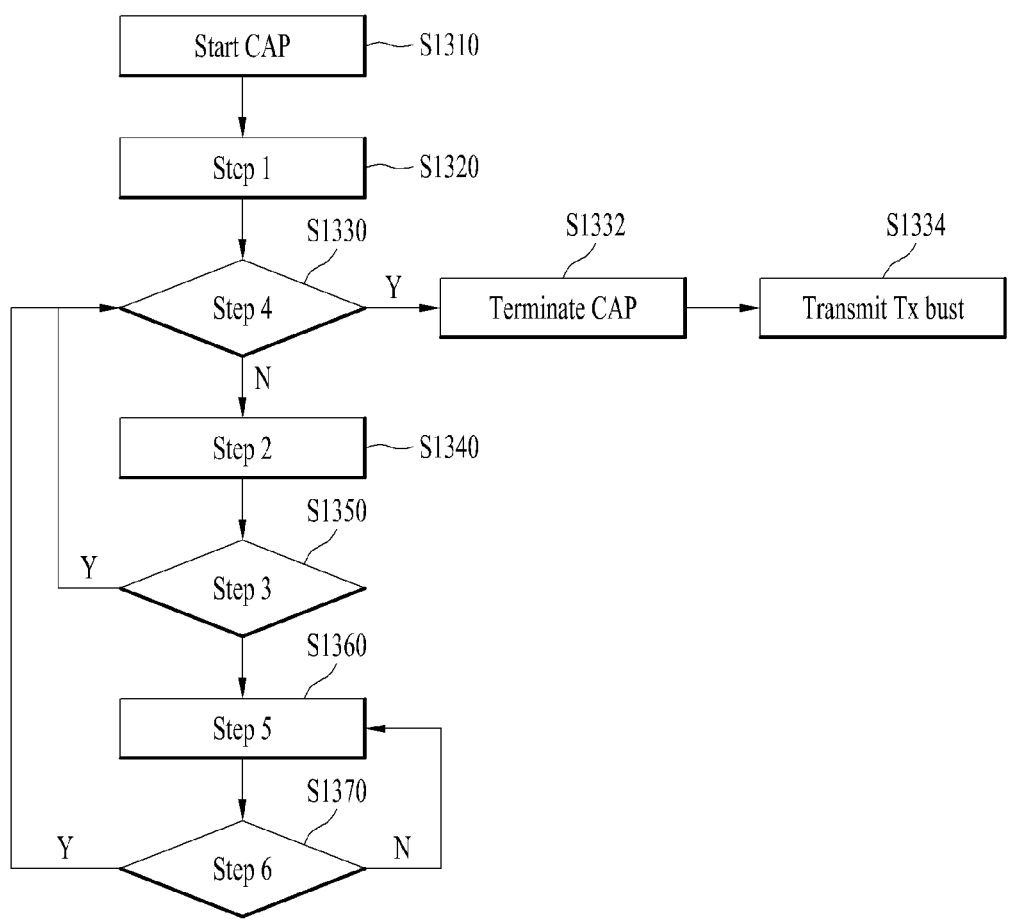

FIG. 13 is a flowchart illustrating UE's Type 1 CAP operations for UL signal transmission.

To transmit a signal in a U-band, a UE may initiate a CAP (S1310). The UE may randomly select a backoff counter N within a contention window (CW) according to step 1. In this case, N is set to an initial value Ninit (S1320). Ninit may have a random value between 0 and CWp. If it is determined according to step 4 that the backoff counter value (N) is 0 (YES in S1330), the UE terminates the CAP (S1332). Then, the UE may transmit a Tx burst (S1334). If the backoff counter value is non-zero (NO in S1330), the UE decreases the backoff counter value by 1 according to step 2 (S1340). The UE checks whether the channel of U-cell(s) is idle (S1350). If the channel is idle (YES in S1350), the UE checks whether the backoff counter value is 0 (S1330). On the contrary, if the channel is not idle in S1350, that is, if the channel is busy (NO in S1350), the UE checks whether the corresponding channel is idle for a defer duration Td (longer than or equal to 25 usec), which is longer than a slot duration (e.g., 9 usec), according to step 5 (S1360). If the channel is idle for the defer duration (YES in S1370), the UE may resume the CAP. Here, the defer duration may include a duration of 16 usec and mp consecutive slot durations (e.g., 9 usec), which immediately follows the duration of 16 usec. If the channel is busy for the defer duration (NO in S1370), the UE performs steps S1360 again to check whether the channel is idle for a new defer duration.

Table 12 shows that the values of $m_p$, a minimum CW, a maximum CW, a maximum channel occupancy time (MCOT), and allowed CW sizes, which are applied to the CAP, vary depending on channel access priority classes.

TABLE 12

| Channel Access Priority Class (p) | $m_P$ | $CW_{min,p}$ | $CW_{max,p}$ | $T_{ulmcot,p}$ | allowed $CW_p$ sizes |
| --- | --- | --- | --- | --- | --- |
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE 1:
For p = 3, 4, $T_{ulmcot,p}$ = 10 ms if the higher layer parameter 'absenceOfAnyOtherTechonology-r14' indicates TRUE. otherwise $T_{ulmcot,p}$ = 6 ms.
NOTE 2:
When $T_{ulmcot,p}$ = 6 ms it may be increased to 8 ms by inserting one or more gaps. The minimum duration of a gap shall be 100 μs. The maximum duration before including any such gap shall be 6 ms.

The size of a CW applied to the Type 1 UL CAP may be determined in various ways. For example, the size of the CW may be adjusted depending on whether the value of of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min,p}$ for every priority class p ∈ {1,2,3,4}. Otherwise, the UE may increase $CW_p$ for every priority class p ∈ {1,2,3,4} to a next higher allowed value.

Here, a reference subframe (or reference slot) $n_{ref}$ may be determined as follows.

When the UE receives a UL grant in a subframe (or slot) $n_g$, if the UE performs transmission including the UL-SCH without gaps starting from a subframe (or slot) $n_0$ and in subframes (or slots) $n_0, n_1, \ldots, n_w$. Here, the subframe (or slot) $n_w$ is the most recent subframe (or slot) before a subframe $n_g$−3 in which the UE has transmitted the UL-SCH based on the Type 1 CAP, and the reference subframe (or slot) $n_{ref}$ is the subframe no.

(2) Type 2 UL CAP Method

When a UE uses the Type 2 CAP to transmit a UL signal (including a PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

Hereinafter, a description will be given of UL timing advance maintenance in the LTE system.

In the LTE system based on the OFDM technology, the time required for a signal transmitted from a UE to arrive at a BS may vary depending on the radius of a cell, the location of the UE within the cell, and/or the movement speed of the UE. That is, unless the BS manages a transmission timing for each UE, a signal transmitted from one UE may cause interference to a signal transmitted from another UE, and thus the error rate of received signals at the BS may increase.

Specifically, when a UE attempts transmission at the boundary of a cell, the time required for a signal transmitted from the UE to arrive at the BS may be longer than the time required for a signal transmitted from a UE at the center of the cell to arrive at the BS. On the contrary, the time required for the transmission from the UE at the center of the cell to arrive at the BS may be shorter than that required for the transmission from the UE at the boundary of the cell to arrive at the BS.

From the perspective of the BS, data or signals transmitted from all UEs in the cell need to be received in a valid time period to avoid interference. Accordingly, the BS needs to adjust the transmission timing of each UE depending on the state of each UE. Such adjustment is called timing advance management.

As a timing advance management method, a random access procedure may be considered. According to the random access procedure, the BS may receive a random access preamble transmitted from the UE and then calculate a timing advance value for advancing or delaying the transmitting timing of the UE. Then, the BS may provide the UE the calculated timing advance value in a random access response, and the UE may update the UL transmission timing based on the timing advance value.

As another method, the BS may receive a sounding reference signal (SRS), which is periodically or randomly transmitted from the UE, calculate a timing advance value for the UE based on the received signal, and then inform the UE of the calculated timing advance value. Thereafter, the UE may update its transmission timing.

As described above, the BS may measure the transmission timing of the UE from the random access preamble or SRS, calculate the timing value to be adjusted, and inform the UE of the calculated value. The timing advance value transmitted from the BS to the UE (i.e., the timing value to be adjusted) is called a timing advance command (TAC). The TAC is processed by MAC layers. Since the UE is not at a fixed location, the transmission timing of the UE may vary every time depending on the UE movement speed, UE location, etc.

Accordingly, upon receiving the TAC from the BS, the UE needs to assume that the TAC is valid only for a specific time period instead of considering that the TAC is permanently valid. To this end, a timing advance timer (TAT) may be used. In other words, when receiving the TAC from the BS, the UE initiates the TAT. Then, the UE assumes that its UL timing is synchronized with the BS only while the TAT runs. The value of the TAT may be transmitted in system information or an RRC signal such as a radio bearer reconfiguration. If the UE receives a new TAC from the BS while the TAT runs, the UE re-initiates the TAT. When the TAT expires or when the TAT does not run, the UE assumes that its UL timing is not synchronized with the BS and thus does not transmit any UL signals, for example, PUSCH and PUCCH signals except the random access preamble.

Hereinafter, a description will be given of a method of transmitting and receiving a RACH and a PUSCH/PUCCH according to the present disclosure.

In the LTE and NR systems based on the OFDMA technology, when a UE-dedicated signal such as a PUSCH/PUCCH is transmitted, the transmission time of each UE is properly controlled such that signals from all UEs are received at the same time in order to control inter-UE interference and facilitate the implementation of a BS.

To this end, in the LTE and NR systems, the time at which a signal from a BS is received by a UE is defined as a reference point ($T_{Ref,\ uE}$), and information on how much earlier the UE transmits a signal with respect to the reference point, i.e., a TA value is configured to be transmitted from the BS to the UE periodically or aperiodically.

In other words, as shown in FIG. 14 (a), the UE transmits a signal at a time earlier by the TA value than the slot boundary of a BS signal received from the BS. However, since the UE does not know the TA value during initial access or handover for accessing a specific BS, the TA value is set to a default TA value for a first transmitted signal from the UE to the BS for the initial access or handover. For example, in the LTE system, the default TA value is 0 in FDD and 624*Ts in TDD. In general, such a default TA value is applied to a RACH signal, and the BS transmits the TA value, which is applied to a UL signal that the UE transmits after transmitting the RACH, in a RACH response (RAR).

In the NR system, it has been defined by specifications that the system operates not only in L-bands granted by a government but also in U-bands based on additional functions. As a representative function thereamong, listen before talk (LBT) operation is considered. According to the LBT operation, before transmitting a signal, a UE checks through energy detection whether other devices occupy a frequency band to share the frequency band with the other devices. Then, the UE transmits the signal in a valid time, i.e., a time for which it is determined that the other devices do not excessively occupy the frequency band. The LBT operation is a kind of clear channel assessment (CCA). That is, the UE may perform CCA at the time before the TA value from the slot boundary for transmitting the PUSCH or PUCCH in the U-band of the NR system as shown in FIG. 14 (a). When determining that the channel is valid, the UE transmits a signal.

In general, since the basic functionality of a RACH signal or a PRACH preamble is to allow the BS to obtain information on whether the RACH signal is generated based on a predefined sequence and information on a RACH reception timing, the RACH signal or PRACH preamble may be transmitted in a relatively narrow frequency band. In the LTE system, one PRACH preamble may occupy 1.08 MHz in 1.4 to 20 MHz systems.

Thus, the RACH signal may be multiplexed and transmitted with a user data channel such as the PUSCH or a control channel such as the PUCCH as shown in FIG. 14 (b) to maximize the frequency efficiency in a wideband system. However, there may be a problem since the default TA value is applied to the RACH signal as described above, compared to the PUSCH or PUCCH signal where a TA value greater than the default TA value is applied.

If the UE transmits the PUSCH or PUCCH signal where the TA value greater than the default TA value is applied before transmitting the RACH signal in the same slot by first performing the CCA for the PUSCH or PUCCH signal, the UE may detect the energy of the transmitted PUSCH or PUCCH signal while performing energy detection for the RACH transmission. As a result, when the PUSCH or PUCCH is scheduled, the RACH transmission may be infeasible, or the priority thereof may decrease.

Hence, a method of allowing the RACH transmission to secure the same priority as the PUSCH or PUCCH is required.

Embodiment 1: Control of Default TA Value Applied to RACH Transmission>

Figure 15:
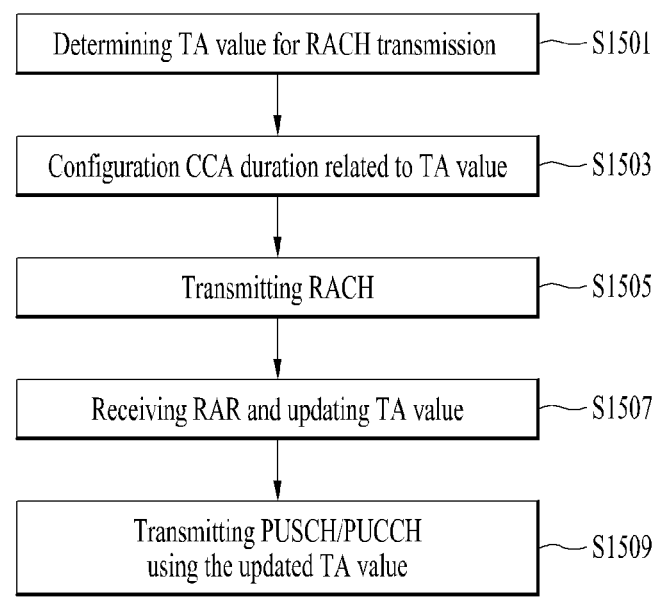
FIGS. 15 to 17 are diagrams for explaining the operations of a user equipment (UE) and a base station (BS) for controlling the timing advance (TA) of a RACH according to embodiments of the present disclosure.

FIG. 15 is a flowchart illustrating UE operations for Embodiments 1-1 to 1-4 and Embodiments 1-a to 1-c according to Embodiment 1, which will be described later. In step S1501, a UE configures a TA value for RACH transmission according to Embodiments 1-1 to 1-4 and Embodiments 1-a to 1-c. That is, in step S1501, the UE determines the TA value for the RACH transmission based on reference signal received power (RSRP), the number of LBT failures, previously used TA, or system information.

In step S1503, the UE configures a CCA duration based on the determined TA value, and if necessary, the UE may adjust the CP length of a RACH. When the UE determines that a channel is not busy after performing a CCA in step S1503, the UE transmits the RACH in step S1505 and then attempts to receive an RAR in step S1507. When the UE fails in receiving the RAR, the UE goes back to step S1501 for RACH retransmission. When the UE succeeds in receiving the RAR, the UE updates the TA value and transmits a PUSCH/PUCCH based on the updated TA value in step S1509. In some cases, step S1509 may be dropped. The UE operations described with reference to FIG. 15 will be described in detail with reference to Embodiments 1-1 to 1-4 and Embodiments 1-a to 1-c.

Figure 16:
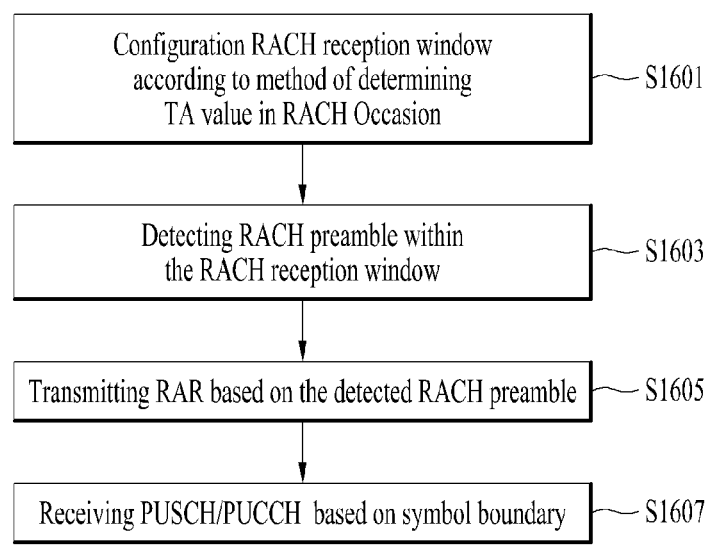

FIG. 16 is a flowchart illustrating BS operations according to Embodiments 1-1 to 1-4 and Embodiments 1-a to 1-c. In step S1601, a BS configures a RACH reception window for RACH reception according to Embodiments 1-1 to 1-4 and Embodiments 1-a to 1-c. In this case, the RACH reception window refers to a duration for performing correlation between preambles. The BS performs the correlation in the RACH reception window in step S1603 and then transmits an RAR to a UE based on detection results in step S1605. Then, the BS receives a PUSCH/PUCCH in step S1607. In this case, since TA is delivered, the PUSCH/PUCCH reception is performed based on a symbol boundary commonly applied to all UEs. In some cases, step S1607 may be dropped.

FIG. 17 is a flowchart illustrating network operations according to Embodiments 1-1 to 1-4 and Embodiments 1-a to 1-c.

In step S1701, a UE configures a TA value for RACH transmission according to Embodiments 1-1 to 1-4 and Embodiments 1-a to 1-c, which will be described later. In particular, the UE determines the TA value for the RACH transmission based on RSRP, the number of LBT failures, previously used TA, or system information. Thereafter, the UE configures a CCA duration based on the determined TA value, and if necessary, the UE may adjust the CP length of a RACH. When the UE determines that a channel is not busy after performing a CCA in the configured CCA duration, the UE transmits the RACH in step S1703. In step S1705, a BS receives the RACH in a RACH reception window and detects a RACH preamble. In step S1707, the BS transmits an RAR to the UE based on the RACH preamble. Upon receiving the RAR, the UE updates the TA value and transmits a PUSCH/PUCCH to the BS based on the updated TA value in step S1709. In some cases, step S1709 may be dropped.

Method of Controlling Default TA Value (TA Value Applied to RACH Transmission)

Embodiment 1-1: Method of Controlling Default TA Value Based on RARP Measurement As described above, whether a signal is transmitted in a U-band is determined by energy detection for a channel. If a RACH signal and a PUSCH/PUCCH signal simultaneously use resources in a RACH slot, the transmission priority of the RACH signal to which a default TA value, which is smaller than the TA value of the PUSCH/PUCCH signal, is applied may significantly decrease.

To solve such a problem, when UEs located at similar positions transmit the RACH signal, the UEs may transmit the RACH signal based on a default TA value similar to the TA value of the PUSCH/PUCCH signal. However, since a BS is incapable of controlling the default TA value of a UE while the UE transmits a RACH, the UE needs to autonomously expect the default TA value. To this end, the present disclosure proposes a method by which the UE expects the default TA value for the RACH transmission by measuring the received signal quality of a signal transmitted from the BS.

That is, the strength of a signal decreases as a propagation distance increases. The amount of decreases in the signal strength is called pathloss. Based on the pathloss and the environment in which the system operates, the UE may estimate the distance between the UE and the BS.

Generally, in communication systems, pathloss is measured for UL power control, and UL transmit power is determined based on the measured pathloss. For the pathloss measurement, the BS informs the transmit power of an RS, and the UE measures RSRP. The pathloss is calculated based on a difference between the two values.

As a similar method, the present disclosure proposes a method of measuring RSRP, anticipating a signal delay between a BS and a UE based on the measured RSRP, and using the signal delay as a default TA value for RACH transmission. In this case, since the distance between the BS and UE is related to pathloss and channel models, the BS may configure the default TA value based on the RSRP by reflecting the surrounding environment.

If the environment changes depending on the position of the UE within a cell, a default TA value set may be configured based on a plurality of RSRPs, and the UE may select any one of the default TA values included in the default TA value set by measuring the channel environment.

To anticipate the default TA value for the RACH transmission, the position of the UE may be directly calculated instead of using an indirect method such as the RSRP. In the LTE system, a positioning reference signal (PRS) has been defined to anticipate the position of the UE with no separate signals as in the global positioning system (GPS). When the BS provides an RS for positioning such as the PRS and information on the position of the BS, the UE may calculate the distance from a target cell to the UE. In addition, the UE may calculate and use the default TA value based on the calculated distance when transmitting the RACH signal. In this case, a CCA duration for transmitting a RACH preamble may be determined based on the calculated default TA value.

If the resolution of the default TA value is extremely high, the default TA value may not be applied to actual transmission. On the contrary, if the resolution of the default TA value is extremely low, it is difficult to obtain effects suitable for the actual RACH transmission even though the accuracy of the calculated default TA value is high.

Accordingly, the default TA value needs to have an appropriate resolution. In general, the resolution of the default TA value may be set equal to the resolution of a default TA value transmitted in an RAR, or it may be predetermined at least based on the subcarrier spacing of the PUSCH/PUCCH. Alternatively, the BS may directly configure the resolution of the TA value depending on the channel state by considering the subcarrier spacing of the PUSCH/PUCCH and the accuracy of the UE measurement.

Embodiment 1-2: Method of Increasing Priority of RACH Transmission Depending on Transmission Delay In Embodiment 1-1, if a default TA value is accurately anticipated based on RSRP, multiplexed signals may have the same transmission priority. However, if there is a significant error in the anticipated default TA value, a UE anticipates the default TA value with the significant error may exclusively occupy a channel and thus block signal transmission of other UEs.

In Embodiment 1-2, it is proposed that a RACH signal is transmitted based on a default TA value, but the default TA value increases if transmission blocking due to LBT frequently occur. When the number of times that the blocking due to the LBT occurs is more than or equal to a predetermined value, the default TA value may sequentially increase by a step size, which is predetermined or configured by a BS. Thus, the transmission priority of the RACH signal based on the LBT may gradually increase.

When the number of times that the blocking occurs is more than or equal to the predetermined value, the default TA value may be calculated based on the method according to Embodiment 1-1 and then applied. In other words, when the number of times that the blocking occurs is more than or equal to the predetermined value, the default TA value may be calculated according to Embodiment 1-1.

When the default TA value sequentially increases, the BS may configure the maximum default TA value. The maximum default TA value may be determined by the maximum cell radius. However, in this case, the default TA value may unnecessarily increase regardless of the distance between the UE and BS, and thus the UE may determine the maximum default TA value based on the default TA value calculation method of Embodiment 1-1.

When the traffic load is low, the UE may attempt RACH transmission in the same way as the conventional one. When the traffic load is high, the UE may dynamically control the default TA value by increasing the default TA value until it becomes similar to the TA value of a PUSCH/PUCCH.

When different default TA values are applied to a plurality of RACH signals, the traffic load may be not low and not high. In this case, if there is no blocking due to the LBT, the RACH transmission priority of the UE may decrease due to RACH signals of other UEs. To solve such a problem, the BS may analyze the traffic load based on the difference between a TA value reported by the UE after succeeding in the RACH transmission and a TA value transmitted in an RAR, update the default TA values for the RACH signals, and then inform UEs of the updated default TA values as RACH resource configurations. In this case, the RACH resource configuration may include the default TA value, the step size for TA values, the number of times that blocking due to the LBT occurs.

The above-described method may reduce not only transmission blocking due to PUSCH/PUCCH signals but also transmission blocking due to other RACH signals.

If the TA value or step size configured by the BS has an extremely high resolution, the TA value or step size may not be applied to actual transmission. On the contrary, if the resolution is extremely low, it is difficult to obtain desirable effects for the RACH transmission even though the accuracy of the calculated TA value is high. Accordingly, the TA value needs to have an appropriate resolution. In general, the resolution of the TA value may be set equal to the resolution of a TA value transmitted in an RAR, or it may be predetermined at least based on the subcarrier spacing of the PUSCH/PUCCH. Alternatively, the BS may directly configure the resolution of the TA value depending on the channel state by considering the subcarrier spacing of the PUSCH/PUCCH and the accuracy of the UE measurement.

When RACH transmission failure occurs due to the signal quality for a RACH resource, the default TA value may increase not only by power ramping but also by blocking transmission of other signals according to the method of Embodiment 1-2 in order to increase the probability of RACH transmission success.

In general, the RACH transmission failure means that no RAR is received for a RACH preamble.

In the case of RACH transmission failure, the BS may configure not only a power ramping step size but also a TA value step size. However, an increase in the default TA value according to Embodiment 1-2 may interrupt signal transmission of neighboring UEs. As a result, unlike power ramping, increasing the default TA value whenever the RACH transmission failure occurs may cause negative effects to the system. Accordingly, not only the step size but also conditions for increasing the step size may be separately defined or configured by the BS.

When the RACH transmission fails even though the default TA value continuously increases, it may block RACH signal transmission of other UEs for a long period of time. Thus, the default TA value may need to go back to the initial default TA value after the predetermined number of times of increment. To this end, the BS may configure the maximum number of transmissions when a value greater than the initial default TA value is applied.

Embodiment 1-3: Method of Applying Previously Used TA Value to RACH

In Embodiment 1-1 or 1-2, it has been described how a BS and a UE transmit and receive a RACH without TA information. In general, the UE may obtain a TA value or update the TA value as a new TA value during such a process.

According to Embodiment 1-3, a BS and a UE may obtain a TA value in advance from a RACH, a PUSCH/PUCCH/SRS, etc. After a predetermined period of time, the RACH is transmitted to reconfigure the connection between the BS and UE.

In general, regardless of whether a UE moves or not, the UE may determine that a previously used TA value is valid for a predetermined time after updating the TA value. Thus, it is proposed that when a UE desires to access a BS that the UE previously accessed based on a RACH and when a TA value previously used in communication is capable of being applied again, a TA value used before RACH transmission is applied again. To determine whether the TA value is valid, the BS may inform the UE of a duration for which the UE is capable of determining the validity of the TA value.

Alternatively, the UE may autonomously determine the validity of the TA value based on its position information.

According to Embodiment 1-3, a different TA value may be applied to each UE during RACH transmission. Thus, the BS may use different RACH preamble indices while allocating resources based on RACH preambles or configure different CP lengths depending on TA values. If necessary, the BS may configure different TA values in RARs. Accordingly, the UE may need to inform the BS whether the UE uses a default TA value or the previously used TA value. To this end, the BS may configure a different RACH resource (e.g., RACH preamble index, RACH time/frequency resource, etc.) depending on the used TA value and then inform that the different RACH resource is configured when configuring the RACH. The UE may use the corresponding information to select a RACH resource when transmitting the RACH or analyze a TA value received in an RAR.

Embodiment 1-4: Configuration of Default TA Value Based on System Information Block (SIB)

In Embodiments 1-1 to 1-3, it has been described how a default TA value for RACH transmission is configured for each UE based on the current channel state. Typically, the default TA value adaptively configured for each UE may be determined depending on the current traffic load and dynamic/static resource allocation of a network. That is, a BS may understand the overall state of the network based on LBT failure statistics, the TA value of a PUSCH/PUCCH currently allocated by the BS, and resource allocation information. Then, the BS may determine a default TA value suitable for the current situation and inform a UE of the default TA value together with a RACH configuration in system information. The UE may use the default TA value configured by the BS as the TA value for the RACH transmission.

Method of Configuring RACH Signal Based on TA Value

Embodiment 1-a

Figure 18:
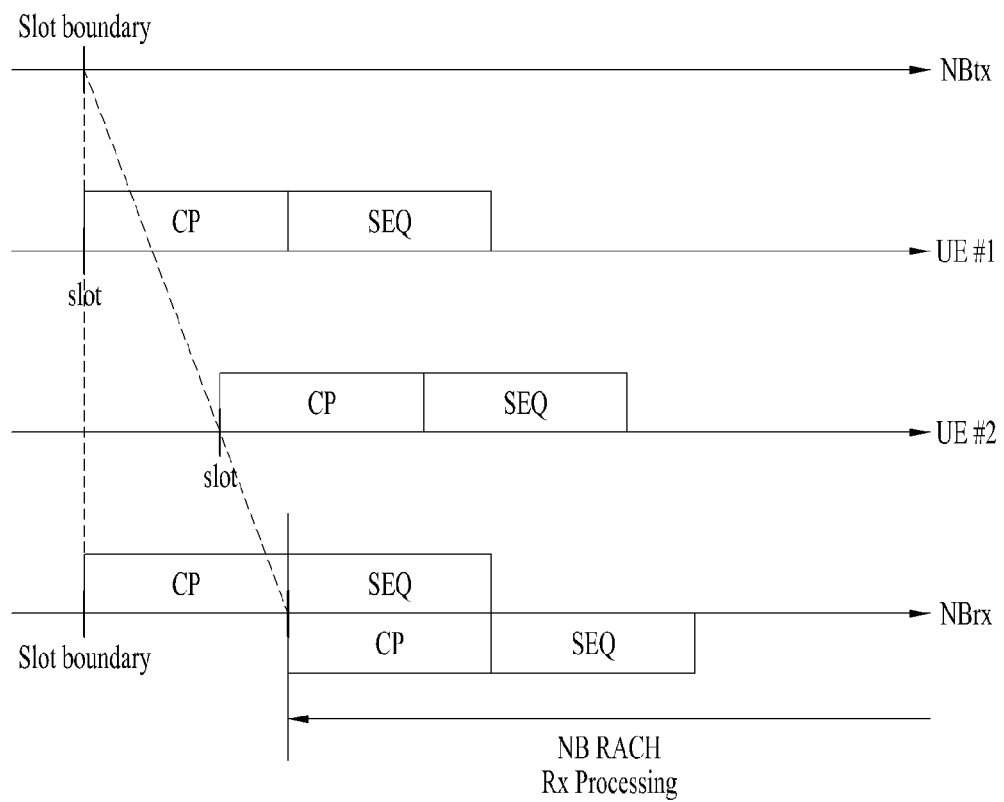
FIGS. 18 to 20 are diagrams for explaining methods of controlling the TA of a RACH according to embodiments of the present disclosure.

According to Embodiment 1-1 or 1-2, a UE may directly calculate a default TA value, and if the calculated default TA value has high accuracy, all RACH signals may be transmitted to a BS such that the signals are aligned with times configured by the BS, i.e., slot boundaries as shown in FIG. 18.

Thus, when a RACH preamble is designed, the CP length thereof may be configured to be equal to that of a PUSCH/PUCCH signal. In this case, the GP length of the RACH preamble may be set to zero. In general, since the CP/GP length of a normal RACH preamble is determined by a supported cell radius, it may have a longer CP than the PUSCH/PUCCH signal.

However, when the default TA value determined according to embodiments 1-1 and 1-2 has low accuracy, the CP of the RACH preamble may be longer than that of the PUSCH/PUCCH and shorter than that of the normal RACH preamble. This may be determined from timing ambiguity based on the estimation accuracy of the default TA value. In Embodiment 1-1 or 1-2, the GP length of the RACH preamble may be greater than zero and shorter than that of the normal RACH preamble.

Figure 19:
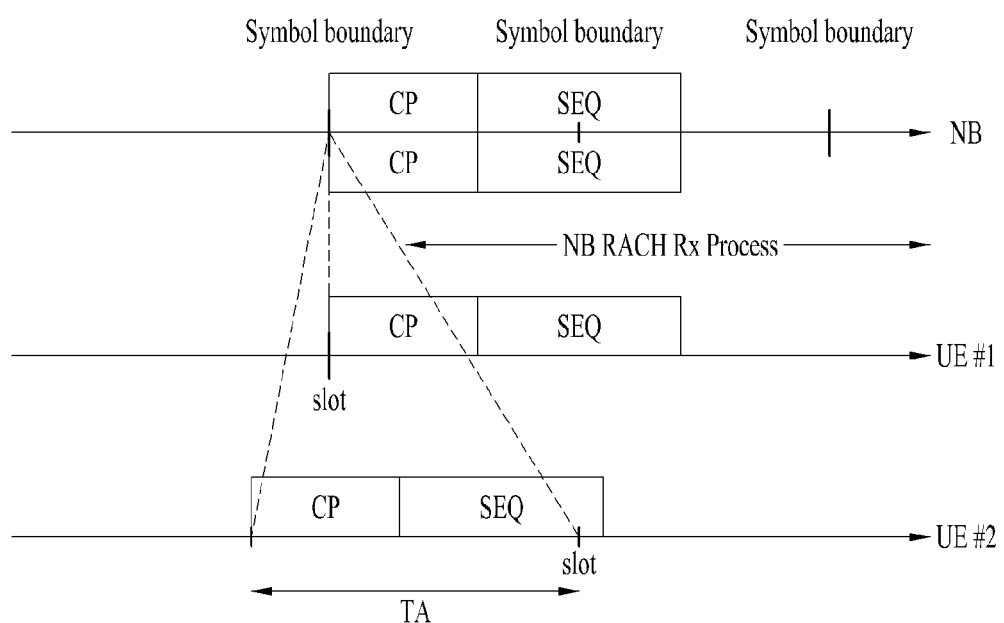

When the RACH preamble is transmitted by applying the calculated default TA value as described above, the BS may detect a RACH signal with respect to a slot boundary at which all signals are simultaneously received as shown in FIG. 19 in detecting a TA signal based on the RACH signal.

In this case, the BS may calculate a TA value based on the RACH preamble and inform the UE of the TA value through an RAR. Then, the UE may determine a TA value used for UL signal transmission by adding the default TA value determined when the RACH preamble is transmitted and the TA value transmitted through the RAR.

However, according to the above-described method, the BS may not accurately know the TA value applied by the UE. Thus, the BS may not use the TA value when allocating resources to the UE as if the BS determines a PUCCH timing for receiving ACK/NACK for a PUSCH in PUSCH scheduling. Thus, when the UE anticipates the TA value as in Embodiment 1-1 or 1-2, it may be required that the UE reports the TA value to the BS.

In the case of a four-step RACH procedure such as a normal initial access procedure, the UE may report a calculated default TA value in Message 3 of the RACH procedure. In the case of a non-four-step RACH procedure such as a handover procedure, the BS may request the UE to report a default TA value in an RAR. In this case, if the default TA value is reported by Message 3, it may increase the message payload. Thus, the default TA value may be implicitly reported using a RACH preamble index in when Message 1 (i.e., RACH preamble) is transmitted.

For example, while allocating 64 RACH preambles in one RACH slot, the BS may configure four RACH preamble groups based on TA values as follows: #0~#15: TA<64Ts, #16~#31: TA<128Ts, #3247: TA<192Ts, #48~#63: TA<256Ts. In other words, the UE may select a RACH preamble index in a RACH preamble group corresponding to the default TA value configured by the UE. The BS may anticipate the default TA value configured by the UE based on the received RACH preamble index. Then, the BS may know a TA value to be used by the UE for actual PUSCH/PUCCH transmission by adding the default TA value to the TA value measured from the RACH preamble.

Embodiment 1-b

According to Embodiment 1-a, when the accuracy of a default TA value determined by a UE before transmitting a RACH preamble is not high, efficiency may be significantly degraded or the complexity of a BS's RACH receiver may significantly increase. Thus, an initially configured default TA value may be used as a TA value for RACH preamble transmission, but a default TA value calculated by a UE according to Embodiment 1-1 or 1-2 may be used in a CCA duration. That is, if the CCA duration is approximately similar to the default TA value calculated by the UE, the UE may perform energy detection in the same duration with a neighboring UE and thus have the same channel occupancy priority as that of a PUSCH/PUCCH.

However, in this case, if a UE is far away from a BS, the UE may have a large time interval between the CCA duration and an actual RACH signal transmission period. Thus, another device may attempt to transmit a RAHC or other signals in the time interval between the CCA duration and the RACH preamble transmission period. If the channel load is high, there may occur a collision between a RACH signal and the signal transmitted from the other device, and as a result, the RACH reception performance may be significantly degraded. To avoid such a problem, the UE may transmit a random signal in the interval between the CCA duration and RACH preamble transmission as shown in FIG. 20 in order to obtain an effect as if the channel is occupied.

However, when the channel traffic load is low, if a signal is transmitted during a time gap between the CCA duration and the RACH signal transmission period, it may cause interference between signal transmission and reception at a neighboring BS. Thus, the BS may monitor the current traffic load and inform UEs of the monitored traffic load. By doing so, when the traffic load is low, the UE may be configured not to transmit the random signal during the gap.

Figure 20:
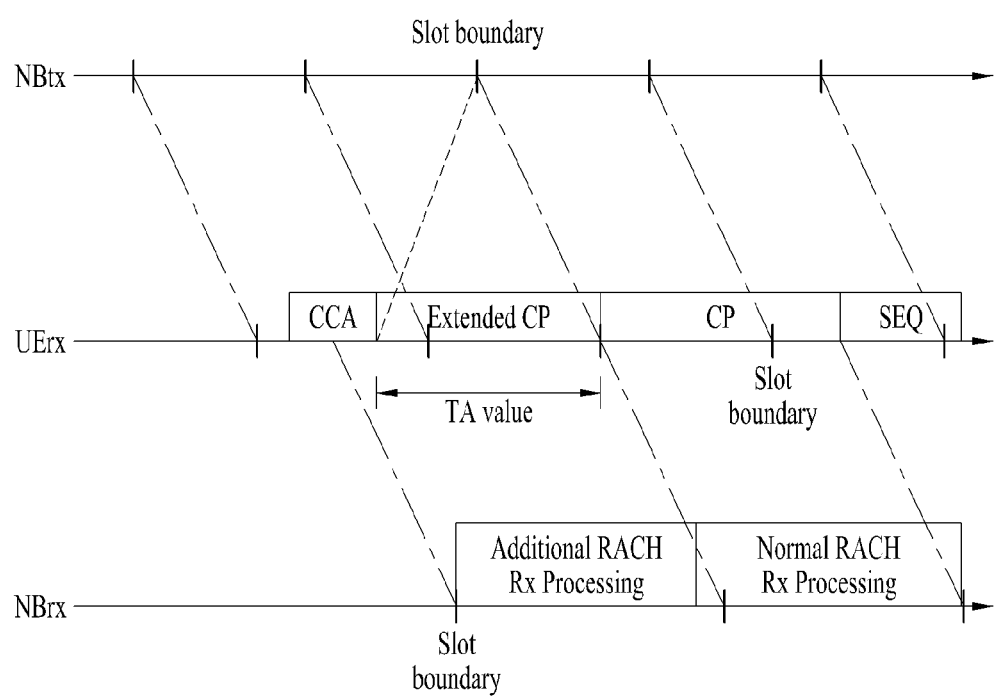

When the random signal is configured with the CP of the RACH preamble as shown in FIG. 20, the BS may use more signals when receiving the RACH. Thus, the operation of configuring the random signal with the CP of the RACH preamble may be defined as the RACH preamble transmission operation of the UE. In particular, configuring the random signal with the CP may become more efficient when a large cell radius is supported.

In addition, configuring the random signal with the CP may be interpreted as adjusting the length of the RACH preamble. That is, the CP length of the RACH preamble is defined as the sum of the initially configured default TA value and the default TA value calculated according to Embodiments 1-1 or 1-2, and the UE transmits the RACH preamble by applying the TA value calculated according to Embodiment 1-1 or 1-2. In this case, in contrast to Embodiment 1-a, a TA value to be used after the RACH transmission may be changed (overridden) to a TA value transmitted in an RAR.

Embodiment 1-c

When a default TA value increases depending on transmission delay according to Embodiment 1-2, if multiple UEs transmit RACH signals on the same RACH transmission resource, the RACH signal transmission of a UE with a large TA value may have a higher priority than the RACH signal transmission of a UE with a small TA value. The reason for this is that the UE with the large TA value may calculate a larger default TA value than other UEs due to measurement errors in Embodiment 1-1 or perform adjustment with a larger default TA value than other UEs due to large transmission delay.

That is, the default TA value may be adjusted to increase the priority of the RACH transmission based on the transmission delay or potential transmission delay, and the adjustment of the default TA value may avoid the transmission delay. However, this may cause blocking transmission of the same RACH signal/channel from other UEs.

To overcome such a problem, it is proposed that a BS configures multiple RACH transmission resources and allocates a different transmission resource based on the default TA value of a RACH signal, which is determined by a UE. For example, it is assumed that in Embodiment 1-2, the default TA value increases by Delta_TA whenever transmission delay due to LBT occurs N times. When the transmission delay occurs N-1 times, a RACH signal is transmitted in slot #1 based on an initially configured default TA value on the assumption that the delay occurs due to the traffic load between multiple systems. When the transmission delay occurs N times or more, a priority is given to a RACH signal of which the transmission is delayed N times or more on the assumption that it is blocked by a PUSCH/PUCCH signal frequency division multiplexed (FDMed) with a RACH slot where a default TA value larger than the initially configured default TA value is used. To increase the transmission success probability due to the delay, the RACH signal is transmitted in slot #1 and slot #2, which is different from slot #1.

By doing so, multiple groups may be configured for each default TA value. Thus, it is possible to reduce not only the transmission blocking probability due to different default TA values between RACH signals but also the blocking probability due to multiplexing with PUSCH/PUCCH resources in the same slot. In this case, if fixed RACH resources are allocated by a RACH resource configuration corresponding to system information, multiple RACH slots may be allocated, and as a result, the efficiency of resource use may be degraded.

To avoid the degradation, when allocating RACH resources through system information, the BS may fix a RACH slot where the initially configured default TA value or a default TA value smaller than the initially configured default TA value is used and allocate a RACH slot where a default TA value larger than the initially configured default TA value is used through a dynamic slot format indicator (SFI) based on transmission delay statistics, thereby increasing the resource use efficiency.

When a UE intending to transmit the RACH is capable of understanding the default TA value applied to the RACH signal by another UE, the UE may configure the default TA value of the RACH signal based thereon, thereby reducing transmission blocking due to different default TA values. In this case, the UE may perform RACH signal detection without any information to know the default TA value used by the other UE. However, for complexity reduction, a different sequence may be allocated depending on the default TA value when the RACH preamble is configured. Assuming that a Zadoff-Chu (ZC) sequence is used, a different root index may be used depending on the default TA value used by another UE when the other UE configures a RACH preamble.

According to the above-described method, if a UE performs a CCA before RACH transmission, the UE may derive the default TA value of another UE by performing RACH sequence detection independently of energy detection. In the case of transmission blocking due to LBT rather than a CCA duration, the UE may attempt to detect a RACH preamble in the entirety of a RACH slot, derive the default TA value of another UE, and then determine its default TA value based on the derived default TA value of the other UE in next RACH transmission.

Embodiment 2: Setting TA Value of PUSCH/PUCCH in RACH Slot to Initially Configured Default TA Value for RACH Transmission>

Before describing the details of Embodiment 2, UE and BS operations according to Embodiment 2 will be explained.

Figure 21:
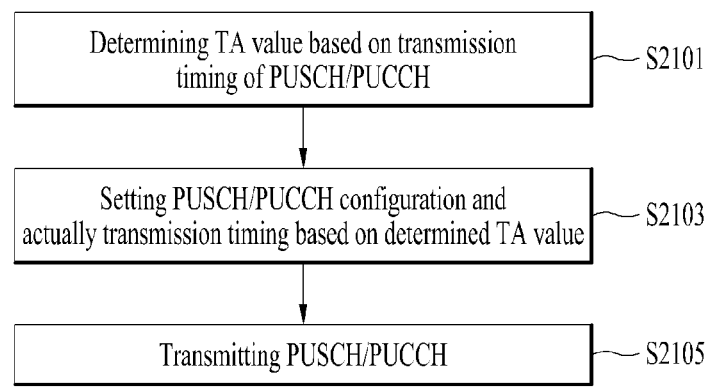
FIGS. 21 to 23 are diagrams for explaining the operations of a UE and a BS for transmitting a PUSCH/PUCCH according to embodiments of the present disclosure.

First, the UE operations according to Embodiment 2 are described with reference to FIG. 21. Referring to FIG. 21, in step S2101, a UE determines a TA value applied to UL transmission according to Embodiment 2 depending on slots for performing UL channel transmission. That is, when a UL transmission slot is not the RACH slot, the UE may use a predetermined TA value. On the contrary, when the UL transmission slot is the RACH slot, the UE may use a default TA value.

In step S2103, the UE configures a UL signal to transmit based on Embodiment 2 and determines the actual transmission time of the UL signal. For example, since the time resource of a UL signal allocated at a transmission time of symbol #0 is behind the first symbol of symbol #0, an extended CP is configured for symbol #0 according to a predefined method. In other words, no UL signal is transmitted before or after the determined actual signal transmission time. In step S2105, the UE transmits a UL channel such as a PUSCH/PUCCH.

Figure 22:
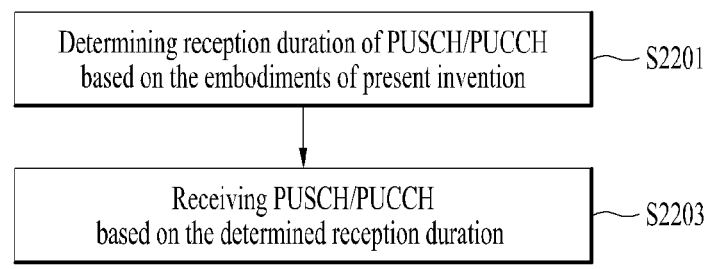

The BS operations according to Embodiment 2 are described with reference to FIG. 22.

In step S2201, a BS determines a UL channel reception time according to Embodiment 2 if a UL channel reception duration is a RACH reception duration. For example, according to embodiment 2, the BS attempts reception at the same symbol boundary as when the UL channel reception duration is not the RACH slot, but since the actual reception time of symbol #0 is delayed by one symbol, the BS determines the UL channel reception duration from the second symbol to the last symbol of allocated resources. In step S2203, the BS receives a UL channel based on the determined reception duration.

Figure 23:
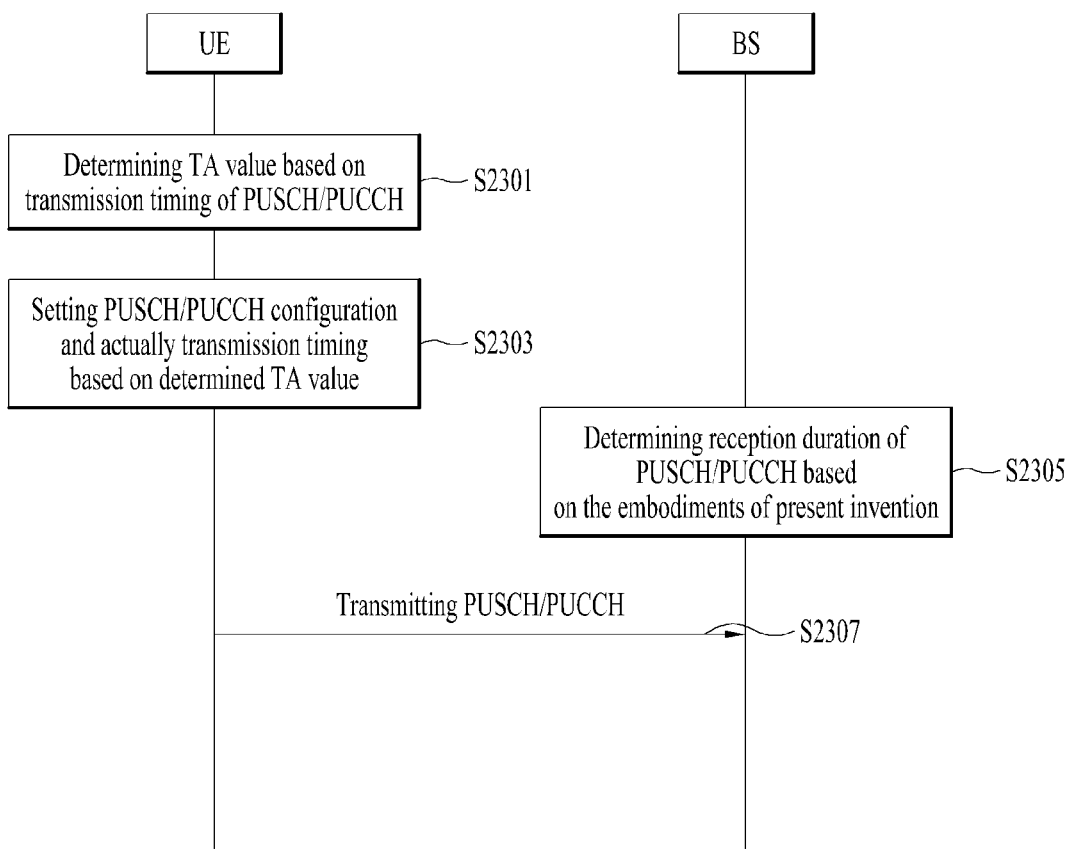

Hereinafter, the operations according to Embodiment 2 will be described from the perspective of a network with reference to FIG. 23.

In step S2301, a UE determines a TA value applied to UL transmission according to Embodiment 2 depending on slots for performing UL channel transmission. That is, when a UL transmission slot is not the RACH slot, the UE may use a predetermined TA value. On the contrary, when the UL transmission slot is the RACH slot, the UE may use a default TA value.

In step S2303, the UE configures a UL signal to transmit based on Embodiment 2 and determines the actual transmission time of the UL signal.

In step S2305, a BS determines a UL channel reception time according to Embodiment 2 if a UL channel reception duration is a RACH reception duration after or while the UE performs steps S2301 and S2303.

In step S2307, the UE transmits a PUSCH/PUCCH based on the TA value and transmission time determined in steps S2301 and S2303, and the BS receives the transmitted PUSCH/PUCCH.

Hereinafter, a PUSCH/PUCCH transmission method for a UE according to Embodiment 2 will be described in detail.

In Embodiment 1-1, it is assumed that the accuracy of a default TA value calculated by a UE is more than or equal to a predetermined level. However, in a rich scatter environment, i.e., when a signal transmitted from a BS arrives at a UE after passing through multiple reflected waves generated by many buildings around the BS, RSRP calculated by the UE may not accurately represent a signal arrival time between the BS and UE.

Thus, in such an environment, if a TA value calculated by the UE is determined as a default TA value, transmission of a PUSCH/PUCCH signal may be blocked by a RACH signal, or the RACH signal may not have the same transmission priority as the PUSCH/PUCCH signal in spite of applying the default TA value calculated by the UE.

To overcome this problem, Embodiment 2 proposes to use a default TA value for RACH transmission as a TA value used for PUSCH/PUCCH transmission in a slot including a RACH occasion. According to the above method, the transmission priority determined by LBT may be the same for all channels independently of channel environments.

Since the default TA value is applied to the PUSCH/PUCCH transmission, the timing at which the BS receives the PUSCH/PUCCH signal may not be aligned with a slot boundary managed by the BS. Instead, the PUSCH/PUCCH signal may be received at a time different from the slot boundary depending on the location of the UE. Information on the default TA value applied to the PUSCH/PUCCH may be anticipated from a previously configured TA value. In other words, when the BS knows the TA value preconfigured by the BS for the PUSCH/PUCCH transmission or the slot or symbol boundary managed by the BS, the BS may approximately anticipate the time at which the BS will receive the PUSCH/PUCCH when the preconfigured TA value is applied.

When the BS requires accurate information about the reception time of a signal from the UE, the BS may configure or predefine that the UE needs to transmit a preamble or SRS in the front portion of a slot in which the PUSCH is transmitted, thereby obtaining the accurate reception timing. When the preamble or SRS transmission causes significant overhead, the BS may perform fine time tracking by allocating an RS to the first symbol at the slot boundary even though the memory requirement or computation of the BS increases.

If the BS considers a simple receiver structure for all PUSCH/PUCCH signals received in a RACH slot such as single fast Fourier transform (FFT) processing for FDMed PUSCH/PUCCH signals as shown in FIG. 24 (a), the CP length of a RACH preamble needs to be determined based on the maximum cell radius. In addition, due to a mismatch between boundaries for FFT, an additional timing acquisition function may be required with respect to predefined DM-RS density for stable reception performance. In the case of the receiver structure shown in FIG. 24 (a), an additional signal may be required to simplify the implementation.

When the BS performs signal detection after performing FFT for each of the FDMed PUSCH/PUCCH signals as shown in FIG. 24 (b), the CP length may be equal to that of a normal PUSCH/PUCCH, but a timing acquisition function or an addition signal therefor may be required.

When a UE transmits a signal as described above, there may be various problems since the reception timing of a BS is not aligned with an OFDM symbol boundary. Thus, the UE attempts to transmit a PUSCH/PUCCH based on the same default TA value as that of a RACH. Specifically, the UE may transmit a signal by adjusting a previously stored TA value such that the signal is aligned with the OFDM symbol boundary. That is, the UE may perform time delay within one symbol or transmit the PUSCH/PUCCH based on a negative TA value.

In other words, when it is expected that the PUSCH/PUCCH transmitted from the UE is not aligned with the symbol boundary as shown in FIG. 25 (a), transmission may be delayed by a time difference (T_retard) between a time when the PUSCH/PUCCH is to be received and the next symbol boundary by applying a default TA value such that the PUSCH/PUCCH is aligned with the next symbol boundary as shown in FIG. 25 (b).

When the PUSCH/PUCCH is transmitted as described above, the transmitted signal is aligned with the symbol boundary. Thus, the BS may operate a receiver in the same way as when the BS receives the PUSCH/PUCCH in a normal slot by matching the symbol boundary with the system time managed by the BS.

The receiver of the BS may anticipate from which symbol the receiver starts to receive the PUSCH/PUCCH based on the previously stored TA value according to the above-described method. When the accuracy of the symbol boundary alignment is degraded, a preamble or an embedded signal may be defined for fine timing alignment in the first symbol of the PUSCH/PUCCH.

However, in the above case, the UE performs LBT in a duration determined based on the default TA value and measures the receiver power of signals transmitted from the BS in the duration where the LBT is performed. In addition, a random signal or a predefined signal such as an extended CP may be transmitted in a duration between the symbol boundary and the actual PUSCH/PUCCH transmission time to prevent other devices from occupying the channel.

In Embodiment 2, since the default TA value is applied to the PUSCH/PUCCH transmission, the time at which the last symbol of the PUSCH/PUCCH is received may be out of the symbol boundary.

In this case, since a signal out of the symbol boundary is not transmitted, the number of valid symbols in a whole slot may be less than that in a normal slot. Whether front or rear symbols of the whole slot are determined as the valid symbols may be determined by the UE based on the TA value according to a predetermined rule. Alternatively, it may be determined and informed by the BS through PUSCH/PUCCH scheduling.

The size of data to be transmitted may be determined based on the number of symbols to be transmitted. If the number of valid symbols to be transmitted is too small compared to the total number of symbols, transmission may be dropped. In this case, the PUSCH/PUCCH is transmitted based on the default TA value or the default TA value+ T_retard, and the BS may perform reception after a delay of X symbols. Then, the BS uses only some symbols (e.g., N-X symbols) among all the symbols (e.g., N symbols) in the slot. Thus, although the UE may transmit one to N-X symbols, the UE may transmit X+1 to N symbols when the BS and UE configures different values for X due to errors in the TA value. When the PUSCH is transmitted in the RACH slot, transmission of only a front-loaded DM-RS may not be suitable. Thus, a DM-RS may be mapped at least after an (X+1)-th symbol.

When the BS knows that the UE transmits a UL channel using only N-X symbols, the BS may perform resource allocation and/or scheduling for UL channels and/or UL symbols in the RACH slot by reflecting the above fact. When both the BS and UE know that the UE transmits a UL channel using only N-X symbols, a transport block size may be determined in consideration thereof.

It may be considered that the actually transmitted first symbol is symbol #1 rather than symbol #0. Specifically, although the TA value is applied to the PUSCH/PUCCH transmission, if the default TA value is applied, it may be considered that no signal is transmitted in a time duration before the transmission time.

Referring to FIG. 26 (a), a part of a signal corresponding to symbol #0 is transmitted, and as a result, the receiving end, i.e., the BS may not use symbol #0.

Thus, a region corresponding to symbol #0 may be occupied by the CP of symbol #1 as shown in FIG. 26 (b). However, when the TA value is smaller than the CP length, the receiving end, i.e., the BS may correctly use the signal corresponding to symbol #0. Thus, in this case, the signal corresponding to symbol #0 may be normally transmitted as shown in FIG. 26 (c).

To this end, the UE may determine which one of the methods illustrated in FIG. 26 (a) to FIG. 26 (c) the UE uses from the TA value of the PUSCH/PUCCH. However, the UE may not receive a TA update command, there may be a mismatch between TA values recognized by the BS and UE. To solve such a problem, the BS may indicate through DCI which one of the methods illustrated in FIG. 26 (a) to FIG. 26 (c) is used, or the UE may report its signal transmission method to the BS.

In the embodiments illustrated in FIG. 26 (a) to FIG. 26 (c), the TA value is basically applied to the PUSCH/PUCCH transmission, but when the default TA value is applied, no PUSCH/PUCCH transmission is performed before UL transmission.

In the embodiments illustrated in FIG. 26 (a) to FIG. 26 (c), when the CP length is at least less than the TA value, a part of a UL channel and/or signal is transmitted, and as a result, the receiving end, the BS may not correctly receive partially transmitted symbols. When a DM-RS is transmitted by the partially transmitted signal, the UL channel may not operate normally.

In other words, the TA value for the PUSCH/PUCCH transmission is basically applied. However, when a UL channel is transmitted in a time duration before the default TA value, if a data region, which is behind a CP region, is included in a time duration where no UL channel is transmitted, the UL channel is partially transmitted. That is, when the length of the CP region is less than the TA value, a part of the data region is not transmitted.

Figure 27:
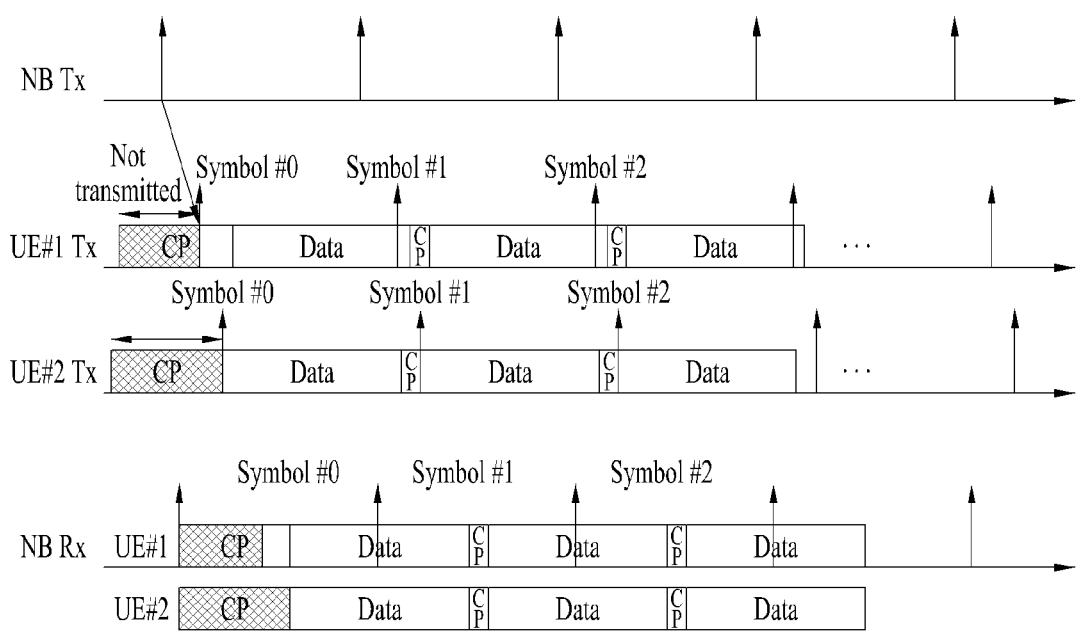

To solve this problem, the CP length of the first symbol may be set more than the TA value as shown in FIG. 27. In this case, the CP length of the first symbol of a UL channel/signal transmitted in a RACH slot may be separately configured by the BS in consideration of the maximum cell radius of the installed network, or it may be set equal to the CP length of a RACH preamble that reflects the maximum cell radius.

When the CP length is modified as described above, the receiving end may receive the UL channel starting from the first OFDM symbol thereof. However, in this case, a symbol boundary for receiving the UL channel/signal in the RACH slot may not be aligned with that applied to a region rather than the RACH slot. Thus, the BS needs to configure an FFT symbol boundary to be used by the receiving end by considering the CP length applied to the RACH slot.

When the UL channel/signal is configured as shown in FIG. 27, the receiving end may not use X OFDM symbols included in the UL channel/signal in a region rather than the RACH slot. Thus, when the UE transmits the UL channel/signal in the RACH slot, the UE may need to transmit only N-X symbols among a total of N symbols that constitute the UL channel. To this end, the UE may perform puncturing of the X symbols or perform rate matching in consideration of the X symbols. Alternatively, if the BS recognizes that only the N-X symbols are transmitted, the BS may perform resource allocation and/or scheduling for the UL channel/ symbol in the RACH slot by considering the partial transmission. When both the BS and UE know that only the N-X symbols are used for the UL channel transmission, a transport block size may be determined in consideration thereof.

In Embodiment 2, the duration in which the UL channel/ signal is transmitted is determined by the default TA value. However, when the CCA duration for RACH transmission is not located at the front portion of the default TA value, the BS needs to control the RACH transmission time or PUSCH/PUCCH transmission time of the UE. In other words, when a RACH preamble format is defined, the front portion of a RACH preamble may be defined as the CCA duration. In this case, the RACH preamble may be transmitted after the CCA duration from a detected symbol boundary. Thus, the actual PUSCH/PUCCH transmission time may be different from the transmission time obtained by applying the default TA value since the CP is present at the front portion of the default TA value. Accordingly, the BS needs to control the PUSCH/PUCCH transmission time or the RACH transmission time. Alternatively, when the PUSCH/PUCCH is first transmitted since the priority of the PUSCH/PUCCH transmission is higher than that of the RACH transmission, the BS may also need to control the transmission.

To this end, a duration in which the PUSCH/PUCCH signal is actually transmitted in the RACH slot may be predefined, or the actual PUSCH/PUCCH transmission time may be informed by a RACH configuration. In this case, multiple values may be predefined or configured rather than one value. When the multiple values are defined, the BS may directly inform the UE of one value to be applied among the multiple values in scheduling information.

For example, when one of the following PUSCH/PUCCH starting positions: 'symbol #0+25 usec' and/or 'symbol #0+25 usec+TA' is indicated by UL resource scheduling information, the UE may recognize that the PUSCH/PUCCH starting position is 'symbol #0+T', where 'symbol #0+T' is a time after T from the starting time of the first symbol when the PUSCH/PUCCH is transmitted after application of the TA value. In the above example, the value of T may be '25 usec' and/or '25 usec+TA'.

When it is determined how the UL channel/signal is transmitted in the RACH slot and when the transmission of the UL channel/signal is allocated within the RACH slot, which is configured by the BS in system information, the UE may transmit the PUSCH/PUCCH by considering how the UL channel/signal is transmitted in the RACH slot. Further, the methods described above in Embodiment 2 may be separately used, but in some cases, the methods may be selectively used.

To this end, PUSCH/PUCCH signal transmission methods in the RACH slot may be defined in advance. Then, which one of the methods is applied may be directly provided by the BS to the UE through higher layer signaling. Alternatively, the UE may determine the transmission method by considering the current state to reduce signaling overhead.

For example, when a signal included in a region of symbol #0 is transmitted in a normal slot according to the size of the TA value, the signal may be transmitted as a signal corresponding to symbol #0 or a CP for a signal corresponding to symbol #1.

As another example, when a format in which the DM-RS is transmitted in symbol #0 is used, the DM-RS transmission may be guaranteed by transmitting a signal corresponding to symbol #0. Otherwise, implementation may be simplified by using a region corresponding to symbol #0 as a CP region for symbol #1. The transmission method may be defined to be selected depending on PUSCH/PUCCH formats configured for the UE.

However, as described above, when signals with different TA values, for example, a RACH and a PUSCH/PUCCH are multiplexed, it may cause a problem in signal transmission priorities in U-bands due to LBT. To avoid such a problem, the NR system operating in the U-bands defines that a RACH slot configured for RACH transmission or some OFDM symbols in the RACH slot are occupied by a RACH preamble and/or RACH-related signals such as the PUSCH/PUCCH (2-step RACH), which are transmitted with the RACH. In addition, the BS may not schedule resources for PUSCH/PUCCH transmission in the corresponding duration. However, when a RACH resource and a channel that supports periodic transmission are configured with different periodicities, there may be a resource collision. When the resource for RACH transmission collides with the transmission of the channel for the periodic transmission, no signal may be transmitted in the corresponding duration until it is clearly recognized that there is no transmission of RACH-related signals for the channel where the periodic transmission is scheduled. To clearly recognize that no RACH-related signals are transmitted, the received power of first M OFDM symbols on a RACH occasion may be measured. Further, rules for recognizing the transmission of a RACH-related signal and parameters for the rules may be configured by the BS in relation to RACH resources.

Figure 28:
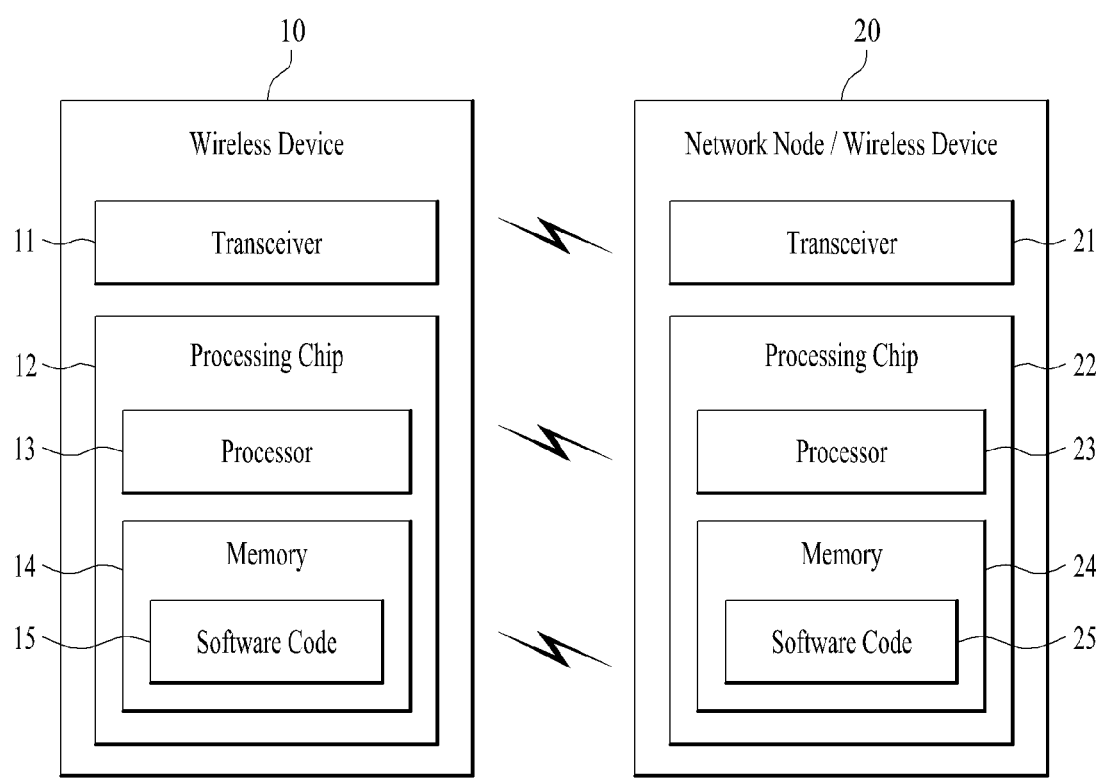
FIG. 28 is a block diagram illustrating the components of a wireless device for implementing the present disclosure.

FIG. 28 is a block diagram illustrating communication between a wireless device 10 and a network node 20. In FIG. 28, the network node 20 may be replaced with a wireless device or a UE.

In the present specification, the wireless device 10 or the network node 20 may include a transceiver 11 or 21 configured to communicate with one or more other wireless devices, network nodes, and/or other entities in the network. The transceiver 11 or 21 may include one or more transmitters, one or more receivers, and/or one or more communications interfaces.

The transceiver 11 or 21 may include one or more antennas. The antenna may be configured to transmit a signal processed by the transmitter 11 or 21 to the outside under the control of a processing chip 12 or 22 or deliver a radio signal received from the outside to the processing chip 12 or 22. The antenna may be referred to as an antenna port. Each antenna may correspond to one physical antenna or be configured by a combination of two or more physical antenna elements. A signal transmitted on each antenna may not be decomposed further at the wireless device 10 or the network node 20. An RS transmitted in relation to a corresponding antenna defines an antenna observed from the perspective of the wireless device 10 or the network node 20. Thus, the RS may allow the wireless device 10 or the network node 20 to estimate a channel for the antenna regardless of whether the channel is a single radio channel from one physical antenna or a composite channel from a plurality of physical antenna elements including the antenna. That is, an antenna is defined such that a channel for carrying a symbol on the antenna is derived from a channel for carrying another symbol on the same antenna. When a transceiver supports multi-input multi-output (MIMO) functionality capable of transmitting and receiving data on a plurality of antennas, the transceiver may be connected to two or more antennas.

In the present disclosure, the transceiver 11 or 21 may be configured to support reception beamforming and transmission beamforming. For example, the transceiver 11 or 21 may be configured to perform the functions illustrated above with reference to FIGS. 9 to 11.

The wireless device 10 or the network node 20 may include the processor chip 12 or 22. The processor chip 12 or 22 may include at least one processor such as a processor 13 or 23 and at least one memory device such as a memory 14 or 24.

The processing chip 12 or 22 may be configured to control at least one of the methods and/or processes described in the present specification. In other words, the processor chip 12 or 22 may be configured to implement at least one of the embodiments disclosed in the present specification.

The processor 13 or 23 may include at least one processor configured to execute the functions of the wireless device 10 or the network node 20 described above in the present specification.

For example, the at least one process may be configured to control the transceiver 11 or 21 in FIG. 28 to transmit and receive information.

The processor 13 or 23 included in the processing chip 12 or 22 may be configured to apply predetermined coding and modulation to a signal and/or data to be transmitted to the outside of the wireless device 10 or the network node 20 and transmit the signal and/or data to the transceiver 11 or 21. For example, the processor 13 or 23 may be configured to convert a data sequence to be transmitted into K layers through demultiplexing, channel coding, scrambling, and modulation. The encoded data sequence may be referred to as a codeword and be equivalent to a transport block, i.e., a data block provided by the MAC layer. One transport block (TB) is encoded as one codeword, and each codeword is transmitted to a receiver in the form of one or more layers. For frequency-up conversion, the transceiver 11 or 21 may include an oscillator. The transceiver 11 or 21 may include $N_t$ transmit antennas (where $N_t$ is a positive integer greater than or equal to 1).

The processing chip 12 or 22 may include the memory 14 or 24 configured to store data, programmable software code, and/or other information for implementing the embodiments described in the present specification.

In other words, the memory 14 or 24 may be configured to store software code 15 or 25 including commands for allowing the processor 13 or 23 to perform some or all of the processes controlled by the processor 13 or 23 in FIG. 28 or implementing the embodiments described above with reference to FIGS. 1 to 27 when being executed by the at least one processor such as the processor 13 or 23.

Specifically, the processing chip 12 of the wireless device 10 according to an embodiment of the present disclosure may be configured to control the operations of the wireless device 10 according to Embodiments 1 and 2 of the present disclosure. According to Embodiment 1 of the present disclosure, the processing chip 12 may determine a TA value for RACH transmission based on Embodiments 1-1 to 1-4 and Embodiments 1-a to 1-c, for example, based on RSRP, the number of LBT failures, previously used TA, or system information and perform a CCA based on the determined TA value. The processing chip 12 may configure the CP length of a RACH and control transceiver 11 to transmit the RACH based on a result obtained by performing the CCA. Then, the processing chip 12 may control the transceiver 11 to receive an RAR from a BS and update the TA value according to a TA command included in the received RAR. Further, the processing chip 12 may control the transceiver 11 to transmit a PUSCH/PUCCH based on the updated TA value.

According to Embodiment 2 of the present disclosure, when a resource for transmitting the PUSCH/PUCCH is a RACH slot, the processing chip 12 may use a default TA value. Otherwise, the processing chip 12 may determine to use a TA value for the PUSCH/PUCCH. In particular, which TA value is used may be determined according to Embodiment 2 as described above. Thereafter, the processing chip 12 may configure a PUSCH/PUCCH signal according to Embodiment 2 and determine the actual transmission time of the PUSCH/PUCCH. In this case, the processing chip 12 may fill symbol #0 with a CP or perform puncturing or rate matching for delayed resources in symbol #0 according to the various examples described above in Embodiment 2. Then, the processing chip 12 may control the transceiver 11 to transmit.

According to Embodiment 1, the processing chip 22 of the network node 20 according to an embodiment of the present disclosure may configure a RACH reception window for receiving a RACH based on Embodiments 1-1 to 1-4 and Embodiments 1-a to 1-c. Thereafter, the processing chip 22 may control the transceiver 21 to receive the RACH from a UE and control the transceiver 21 to transmit an RAR to the UE. The processing chip 22 may control the transceiver 21 to receive a PUSCH/PUCCH, which is transmitted based on a TA command included in the RAR.

According to Embodiment 2, when the PUSCH/PUCCH is received in a RACH reception duration, i.e., a RACH slot, the processing chip 22 may determine the reception time of the PUSCH/PUCCH based on Embodiment 2. Then, the processing chip 22 may control the transceiver 21 to receive the PUSCH/PUCCH at the reception time.

The above-described embodiments are combinations of elements and features of the present disclosure in prescribed forms. The elements or features may be considered as selective unless specified otherwise. Each element or feature may be implemented without being combined with other elements or features. Further, the embodiment of the present disclosure may be constructed by combining some of the elements and/or features. The order of the operations described in the embodiments of the present disclosure may be modified. Some configurations or features of any one embodiment may be included in another embodiment or replaced with corresponding configurations or features of the other embodiment. It is obvious to those skilled in the art that claims that are not explicitly cited in each other in the appended claims may be presented in combination as an embodiment of the present disclosure or included as a new claim by a subsequent amendment after the application is filed.

In this document, a specific operation described as performed by the BS may be performed by an upper node of the BS. That is, it is apparent that various operations for communication with the UE may be performed by the BS or other network nodes rather than the BS in a network including a plurality of network nodes including the BS. The term 'base station' may be replaced with the term 'fixed station', 'Node B', 'eNode B (eNB)', 'access point (AP)', etc.

The embodiments of the present disclosure may be achieved by various means, for example, hardware, firmware, software, or any combination thereof. In a hardware configuration, the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. for performing the above-described functions or operations. Software code may be stored in the memory and executed by the processor. The memory is located at the interior or exterior of the processor and may transmit and receive data to and from the processor via various known means.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the method of transmitting and receiving a random access channel and an uplink channel in an unlicensed band and apparatus therefor have been described based on the 5G NR system, the method and apparatus are applicable to various wireless communication systems as well as the 5G NR system.

The invention claimed is:

1. A method of transmitting, by a user equipment (UE), an uplink signal in an unlicensed band, the method comprising:
performing a clear channel assessment (CCA) on the unlicensed band; and
transmitting the uplink signal in a specific slot based on a result obtained by performing the CCA,
wherein the CCA is performed based on a Listen-before-Talk (LBT) operation,
wherein the uplink signal is a Physical Uplink Control Channel (PUCCH) or a Physical Uplink Shared Channel (PUSCH),
wherein, based on the specific slot being a random access channel (RACH) slot, the uplink signal is transmitted based on a default timing advance (TA) value for RACH signal transmission, and
wherein a cyclic prefix (CP) length of a first symbol of the uplink signal is equal to a CP length of a RACH preamble related to the RACH slot.

2. The method of claim 1, wherein the uplink signal is delayed and transmitted such that a boundary of a first symbol for transmitting the uplink signal is aligned with a boundary of a second symbol for receiving the uplink signal.

3. The method of claim 2, wherein a random signal is transmitted during the delay.

4. The method of claim 3, wherein the random signal is a cyclic prefix (CP).

5. The method of claim 1, wherein due to the transmission of the uplink signal based on the default TA value, transmission of symbols capable of being transmitted after a boundary of the specific slot is dropped.

6. The method of claim 5, wherein based on a number of the symbols capable of being transmitted after the boundary of the specific slot being greater than or equal to a threshold, the transmission of the uplink signal is dropped.

7. The method of claim 1, wherein the uplink signal is transmitted based on a TA value for the uplink signal, and wherein the transmission of the uplink signal is dropped during a time duration before a transmission start time based on the default TA value.

8. The method of claim 1, wherein the uplink signal is transmitted based on a TA value for the uplink signal, and wherein a first symbol related to a transmission start time based on the default TA value is transmitted as a cyclic prefix (CP).

9. A communication device for transmitting an uplink signal in an unlicensed band, the communication device comprising:
a memory; and
a processor connected to the memory,
wherein the processor is configured to:
perform a clear channel assessment (CCA) on the unlicensed band; and
transmit the uplink signal in a specific slot based on a result obtained by performing the CCA,
wherein the CCA is performed based on a Listen-before-Talk (LBT) operation,
wherein the uplink signal is a Physical Uplink Control Channel (PUCCH) or a Physical Uplink Shared Channel (PUSCH),
wherein, based on the specific slot being a random access channel (RACH) slot, the uplink signal is transmitted based on a default timing advance (TA) value for RACH signal transmission, and
wherein a cyclic prefix (CP) length of a first symbol of the uplink signal is equal to a CP length of a RACH preamble related to the RACH slot.

10. A method of receiving, by a base station, an uplink signal in an unlicensed band, the method comprising:
determining a reception duration for receiving the uplink signal in a random access channel (RACH) slot; and
receiving the uplink signal within the determined reception duration,
wherein the CCA is performed based on a Listen-before-Talk (LBT) operation,
wherein the uplink signal is a Physical Uplink Control Channel (PUCCH) or a Physical Uplink Shared Channel (PUSCH),
wherein the reception duration is determined based on a default timing advance (TA) value for RACH signal transmission, and
wherein a cyclic prefix (CP) length of a first symbol of the uplink signal is equal to a CP length of a RACH preamble related to the RACH slot.

* * * * *